US006657324B1

(12) United States Patent
Marumoto

(10) Patent No.: US 6,657,324 B1
(45) Date of Patent: Dec. 2, 2003

(54) MICROMACHINE SWITCH AND METHOD OF MANUFACTURE THEREOF

(75) Inventor: Tsunehisa Marumoto, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/959,449
(22) PCT Filed: Apr. 26, 2000
(86) PCT No.: PCT/JP00/02725
§ 371 (c)(1),
(2), (4) Date: Oct. 25, 2001
(87) PCT Pub. No.: WO00/65626
PCT Pub. Date: Nov. 2, 2000

(30) Foreign Application Priority Data

Apr. 27, 1999 (JP) .............................. 11/119743

(51) Int. Cl.[7] .............................. H02B 1/24; H01P 1/10; H05K 3/10; H01L 21/311
(52) U.S. Cl. .................... 307/125; 29/846; 333/101; 333/105; 333/124; 333/262; 438/689
(58) Field of Search ................. 333/101–108, 333/109, 112, 115, 116, 158–164, 262, 32; 200/181, 600; 307/112–124; 29/592–885; 257/415–421; 427/96; 430/311–319; 438/689–709; 216/11–19

(56) References Cited

U.S. PATENT DOCUMENTS

| 5,578,976 | A | * | 11/1996 | Yao .............................. 333/262 |
| 5,880,921 | A | * | 3/1999 | Tham et al. ................ 361/233 |
| 6,037,719 | A | * | 3/2000 | Yap et al. ................. 315/169.3 |
| 6,046,659 | A | * | 4/2000 | Loo et al. .................... 333/262 |
| 6,069,540 | A | * | 5/2000 | Berenz et al. .............. 333/101 |
| 6,072,686 | A | * | 6/2000 | Yarbrough ................. 361/234 |
| 6,100,477 | A | * | 8/2000 | Randall et al. ............ 200/181 |
| 6,248,668 | B1 | * | 6/2001 | Beebe et al. ............... 438/702 |
| 6,331,257 | B1 | * | 12/2001 | Loo et al. .................... 216/13 |
| 6,542,051 | B1 | * | 4/2003 | Nakada ....................... 333/164 |

FOREIGN PATENT DOCUMENTS

| JP | 04-269416 | 9/1992 |
| JP | 09-17300 | 1/1997 |
| JP | 09-213191 | 8/1997 |

* cited by examiner

Primary Examiner—J. R. Scott
(74) Attorney, Agent, or Firm—Sughrue Mion, PLLC

(57) ABSTRACT

A micromachine switch for use in a millimeter wave circuit and a microwave circuit is simpler in structure than conventional micromachine switches. The micromachine switch has first and second high-frequency signal lines (1b, 1a), cantilever (11) fixed to an end of the first high-frequency signal line (1b) and extending to a position above second high-frequency signal line (1a), first insulating means (15) disposed on second high-frequency signal line (1a), second insulating means (14) disposed in an area where cantilever (11) and second high-frequency signal line (1a) confront each other, and first control signal line (2) connected between an end of second high-frequency signal line (1a) and first insulating means (15), for applying a control signal. When the control signal is applied to second high-frequency signal line (1a), cantilever (11) is attracted to second high-frequency signal line (1a), and connected to second high-frequency signal line (1a) via second insulating means (14) in a high-frequency fashion.

21 Claims, 15 Drawing Sheets

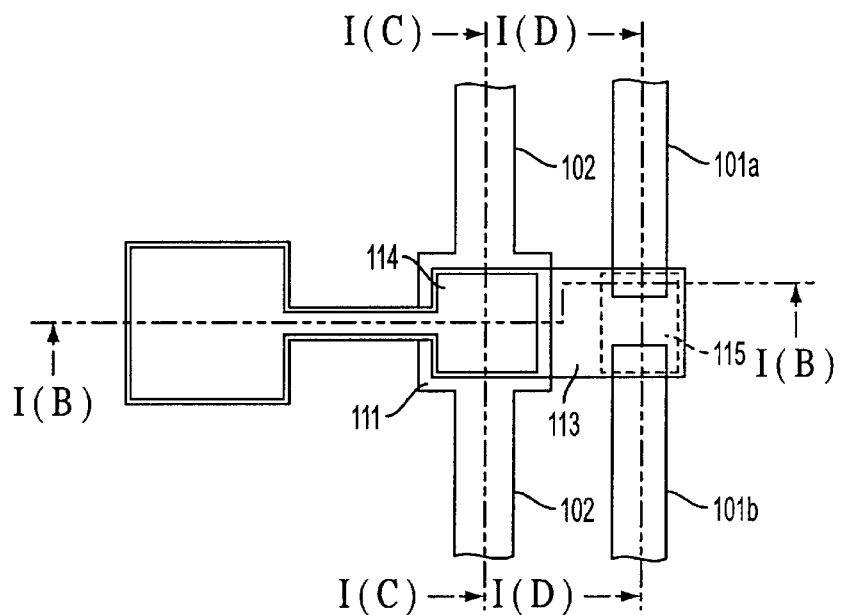
FIG. 1(A)
(PRIOR ART)
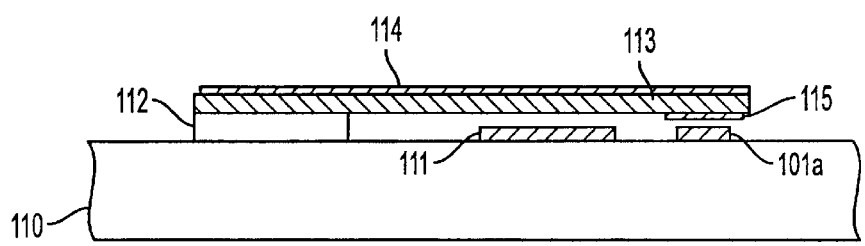
FIG. 1(B)
(PRIOR ART)
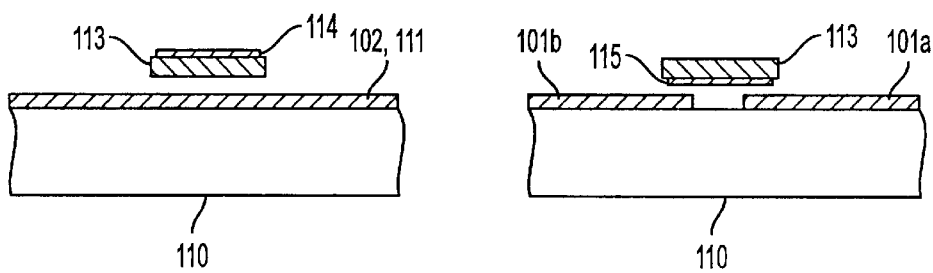
FIG. 1(C)
(PRIOR ART)
FIG. 1(D)
(PRIOR ART)

MICROMACHINE SWITCH AND METHOD OF MANUFACTURE THEREOF

TECHNICAL FIELD

The present invention relates to a micromachine switch for use in millimeter wave circuits and microwave circuits.

BACKGROUND ART

Switch devices for use in millimeter wave circuits and microwave circuits include PIN diode switches, HEMT switches, and micromachine switches. Micromachine switches in particular suffer a smaller loss, are less costly, and have a lower power requirement than the other switch devices.

One conventional micromachine switch is disclosed in Japanese laid-open patent publication No. 9-17300, for example. FIG. 1(A) of the accompanying drawings is a plan view of the conventional micromachine switch. FIG. 1(B) is a cross-sectional view taken along line I(B)—I(B) of FIG. 1(A). FIG. 1(C) is a cross-sectional view taken along line I(C)—I(C) of FIG. 1(A). FIG. 1(D) is a cross-sectional view taken along line I(D)—I(D) of FIG. 1(A).

As shown in FIG. 1(A), high-frequency signal lines 101a, 101b spaced from each other by a small gap are disposed on substrate 110. Lower electrode 111 is disposed on substrate 110 at a position spaced from high-frequency signal lines 101a, 101b. Post 112 is disposed on substrate 110 at a position on a line extending from the gap between high-frequency signal lines 101a, 101b through lower electrode 111.

Arm 113 has a proximal end fixedly mounted on an upper surface of post 112. Arm 113 extends from the upper surface of post 112 over lower electrode 111 to a position above the gap between high-frequency signal lines 101a, 101b. Arm 113 is made of an insulating material.

Upper electrode 114 is disposed on an upper surface of arm 113. Upper electrode 114 extends from a position above post 112 to a position above lower electrode 111.

Contact 115 is disposed on a lower surface of the distal end of arm 113. Contact 115 extends from a position above the end of high-frequency signal line 101a over the gap to a position above the end of high-frequency signal line 101b.

Control signal line 102 is connected to lower electrode 111 for applying a control signal to change connected states of high-frequency signal lines 101a, 101b to lower electrode 111.

When a positive voltage, for example, is applied as the control signal to lower electrode 111, positive charges are generated on the upper surface of lower electrode 111, and negative charges are developed on the lower surface of upper electrode 114 which confronts lower electrode 111 due to electrostatic induction. Upper electrode 114 is now attracted to lower electrode 111 under attractive forces developed therebetween. Arm 113 is curved to displace contact 115 downwardly. When contact 115 is brought into contact with both high-frequency signal lines 101a, 101b, high-frequency signal lines 101a, 101b are connected to each other by contact 115 in a high-frequency fashion.

When the positive voltage is no longer applied to lower electrode 111, since no attractive forces are developed between upper and lower electrodes 114, 111, contact 115 returns to its position spaced from high-frequency signal lines 101a, 101b under recovering forces of arm 113. High-frequency signal lines 101a, 101b are now disconnected from each other.

The conventional micromachine switch shown in FIG. 1 has a complex three-dimensional structure because post 112 and arm 113 are required to support contact 115, other than contact 115 for connecting and disconnecting high-frequency signal lines 101a, 101b and also because lower electrode 111 and upper electrode 114 are required control displacement of contact 115. A complex fabrication process composed of many steps is needed to manufacture the micromachine switch of the complex structure.

The present invention has been made in an attempt to solve the above problems. It is an object of the present invention to provide a micromachine switch of a simple structure.

DISCLOSURE OF THE INVENTION

In order to achieve the above object, a micromachine switch according to the present invention has first and second high-frequency signal lines having their respective ends spaced from each other, a cantilever fixed to the end of either the first or the second high-frequency signal line and extending to a position above the end of the other high-frequency signal line, the cantilever including an electrically conductive member, first insulating means disposed on the first high-frequency signal line, second insulating means disposed in an area where the cantilever and the other high-frequency signal line confront each other, and a first control signal line connected between the end of the first high-frequency signal line and the first insulating means, for applying the control signal which is represented by DC voltage level variations.

An arrangement of the first insulating means comprises a capacitor.

An arrangement of the second insulating means comprises an insulating film disposed on at least one of a lower surface of the cantilever and an upper surface of the other high-frequency signal line.

The cantilever has both a function as a movable contact and a function as a support means for supporting the movable contact. The cantilever 11 functionally corresponds to contact 115, arm 113, and post 112 of the conventional micromachine switch, and the former is of a simpler structure than the latter.

Since the control signal is applied to the first or second high-frequency signal line to control operation of cantilever, lower electrode 111 and upper electrode 114 which have heretofore been required are no longer necessary. For this reason, the micromachine switch is thus further simple in structure.

While the first insulating means disposed on the first high-frequency signal line and the second insulating means for providing a capacitive coupling are indispensable according to the present invention, the micromachine switch is of a simple structure as a whole according to the present invention.

The micromachine switch may further comprise first high-frequency signal blocking means connected to the first control signal line, for blocking the passage of a high-frequency signal flowing through the first and second high-frequency signal lines.

A first arrangement of the first high-frequency signal blocking means comprises a high-impedance line having an end connected between the end of the first high-frequency signal line on which the first insulating means is disposed and the first insulating means, and having a line length which is about ¼ of the wavelength of the high-frequency signal and a characteristic impedance larger than the characteristic impedance of the first or second high-frequency signal line, and a low-impedance line having an end connected to the other end of the high-impedance line and an opposite end which is open, and having a line length which is about ¼ of the wavelength of the high-frequency signal and a characteristic impedance smaller than the characteristic impedance of the high-impedance line, the first control signal line being connected to the other end of the high-impedance line.

A second arrangement of the first high-frequency signal blocking means comprises a high-impedance line having an end connected between the end of the first high-frequency signal line on which the first insulating means is disposed and the first insulating means, and having a line length which is about ¼ of the wavelength of the high-frequency signal and a characteristic impedance larger than the characteristic impedance of the first or second high-frequency signal line, and a capacitor having an electrode connected to the other end of the high-impedance line and another electrode to ground, the first control signal line being connected to the other end of the high-impedance line.

A third arrangement of the first high-frequency signal blocking means comprises an inductive element.

A fourth arrangement of the first high-frequency signal blocking means comprises a resistive element having an impedance sufficiently larger than the characteristic impedance of the first or second high-frequency signal line.

The resistive element may be inserted in series in the first control signal line. Alternatively, the resistive element may have an end connected to the first control signal line and another end which is open.

The first high-frequency signal blocking means in the first control signal line is effective to prevent the high-frequency signal from leaking to the first control signal line.

The micromachine switch may further comprise a second control signal line connected to the second high-frequency signal line on which the first insulating means is not disposed, for charging and discharging electric charges generated by electrostatic induction, and second high-frequency signal blocking means connected to the second control signal line, for blocking the passage of the high-frequency signal flowing through the first and second high-frequency signal lines.

A first arrangement of the second high-frequency signal blocking means comprises a high-impedance line having an end connected to the second high-frequency signal line on which the first insulating means is not disposed, and having a line length which is about ¼ of the wavelength of the high-frequency signal and a characteristic impedance larger than the characteristic impedance of the first or second high-frequency signal line, and a low-impedance line having an end connected to the other end of the high-impedance line and an opposite end which is open, and having a line length which is about ¼ of the wavelength of the high-frequency signal and a characteristic impedance smaller than the characteristic impedance of the high-impedance line, the second control signal line being connected to the other end of the high-impedance line.

A second arrangement of the second high-frequency signal blocking means comprises a high-impedance line having an end connected to the second high-frequency signal line on which the first insulating means is not disposed, and having a line length which is about ¼ of the wavelength of the high-frequency signal and a characteristic impedance larger than the characteristic impedance of the first or second high-frequency signal line, and a capacitor having an electrode connected to the other end of the high-impedance line and another electrode to ground, the second control signal line being connected to the other end of the high-impedance line.

A third arrangement of the second high-frequency signal blocking means comprises an inductive element.

A fourth arrangement of the second high-frequency signal blocking means comprises a resistive element having an impedance sufficiently larger than the characteristic impedance of the first or second high-frequency signal line.

The resistive element may be inserted in series in the second control signal line. Alternatively, the resistive element may have an end connected to the second control signal line and another end which is open.

As electric charges generated by electrostatic induction are charged and discharged through the second control signal line, the micromachine switch performs stable switching operation and has an increased switching speed. The second high-frequency signal blocking means in the second control signal line is effective to prevent the high-frequency signal from leaking to the second control signal line.

The micromachine switch may further comprise a first high-impedance line having an end connected between the end of the first high-frequency signal line on which the first insulating means is disposed and the first insulating means, and having a line length which is about ¼ of the wavelength of a first or second high-frequency signal and a characteristic impedance larger than the characteristic impedance of the first or second high-frequency signal line, a second high-impedance line having an end connected to the second high-frequency signal line on which the first insulating means is not disposed, and having a line length which is about ¼ of the wavelength of the first or second high-frequency signal and a characteristic impedance larger than the characteristic impedance of the first or second high-frequency signal line, and a capacitor having an electrode connected to the other end of the first high-impedance line and another electrode to the other end of the second high-impedance line, the other end of the first high-impedance line being connected to the first control signal line and the other end of the second high impedance line being connected to ground.

The first high-impedance line, the capacitor, and the ground jointly make up first high-frequency signal blocking means. The second high-impedance line connected to ground provides second first high-frequency signal blocking means.

The micromachine switch further comprises third insulating means disposed on the second high-frequency signal line on which the first insulating means is not disposed, a second control signal line connected between the end of the first or second high-frequency signal line on which the third insulating means is disposed and the third insulating means, for applying a constant voltage having a polarity opposite to the control signal, and second high-frequency signal blocking means connected to the second control signal line, for blocking the passage of a high-frequency signal flowing through the first and second high-frequency signal lines, the arrangement being such that a DC voltage between the second and third insulating means is kept at the level of the constant voltage.

If a predetermined voltage is applied to the high-frequency signal line to which the control signal is not applied, then the magnitude of the voltage of the control signal can be reduced by the predetermined voltage.

According to the present invention, there is provided a method of manufacturing a micromachine switch, comprising the steps of forming, on a substrate, a first high-frequency signal line, a third high-frequency signal line having an end spaced from an end of the first high-frequency signal line, and a control signal line connected to the third high-frequency signal line, forming a sacrificial layer in at least a region extending from a gap between the first and third high-frequency signal lines to the end of the third high-frequency signal line, forming a first insulating film on a portion of the sacrificial layer which confronts the end of the third high-frequency signal line, and a second insulating film on the other end of third high-frequency signal line, forming a cantilever of metal in a region extending from the end of the first high-frequency signal line to the first insulating film on the sacrificial layer, and a fourth high-frequency signal line extending from an upper surface of the second insulating film onto the substrate, and removing the sacrificial layer.

According to the present invention, there is also provided a method of manufacturing a micromachine switch, comprising the steps of forming, on a substrate, a fifth high-frequency signal line, a second high-frequency signal line having an end spaced from an end of the fifth high-frequency signal line, and a control signal line connected to the fifth high-frequency signal line, forming a sacrificial layer in at least a region extending from a gap between the fifth and second high-frequency signal lines to the end of the second high-frequency signal line, forming a first insulating film on a portion of the sacrificial layer which confronts the end of the second high-frequency signal line, and a second insulating film on the other end of fifth high-frequency signal line, forming a cantilever of metal in a region extending from the end of the fifth high-frequency signal line to the first insulating film on the sacrificial layer, and a sixth high-frequency signal line extending from an upper surface of the second insulating film onto the substrate, and removing the sacrificial layer.

The micromachine switch can thus be manufactured in a small number of steps.

BRIEF DESCRIPTION OF THE DRAWINGS

FIGS. 1(A) through 1(D) are views showing a conventional micromachine switch;

BEST MODE FOR CARRYING OUT THE INVENTION

Embodiments of the present invention will be described in detail below with reference to the drawings.

1st Embodiment

Figure 2A:
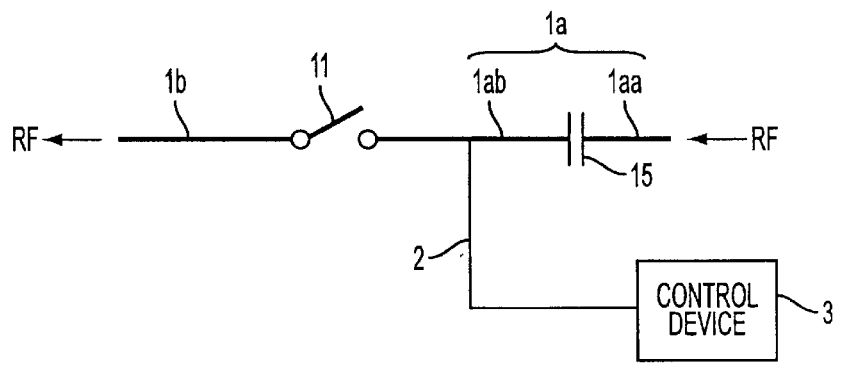
FIGS. 2(A) through 2(D) are views showing a micromachine switch according to a first embodiment of the present invention.
Figure 2B:
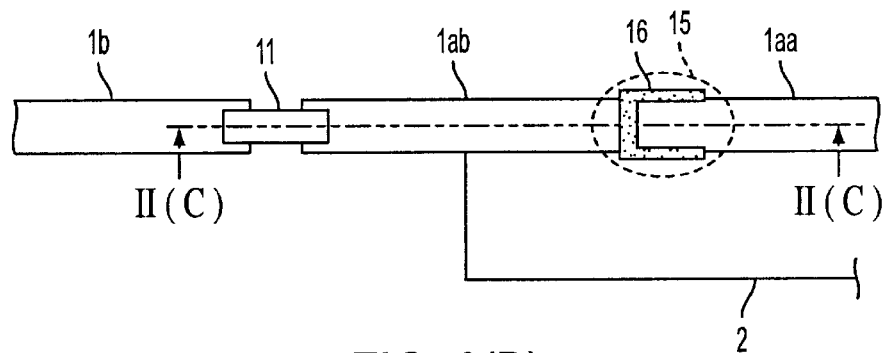
Figure 2C:
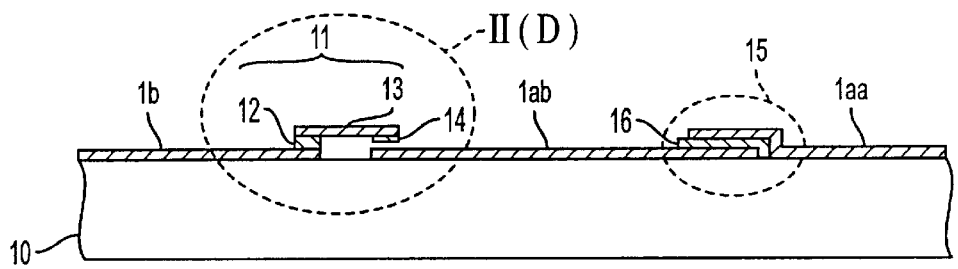
Figure 2D:
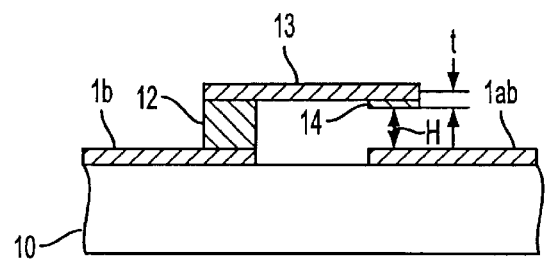

FIGS. 2(A) through 2(D) are views showing a micromachine switch according to a first embodiment of the present invention. FIG. 2(A) is a circuit diagram of the micromachine switch. FIG. 2(B) is a plan view of the micromachine switch. FIG. 2(C) is a cross-sectional view taken along line II(C)—II(C) of FIG. 2(B). FIG. 2(D) is an enlarged cross-sectional view of an encircled area II(D) in FIG. 2(B).

As shown in FIGS. 2(A) through 2(D), high-frequency signal lines 1a, 1b spaced from each other by a small gap are disposed on substrate 10. High-frequency signal line 1a is referred to as a first high-frequency signal line, and high-frequency signal line 1b is referred to as a second high-frequency signal line. High-frequency signal lines 1a, 1b comprise microstrip lines made of a metal such as Al, for example. However, high-frequency signal lines 1a, 1b may comprise any of other distributed-constant lines including coplanar lines, triplate lines, and slotted lines.

High-frequency signal line 1a comprises high-frequency signal lines 1aa, 1ab which are connected to each other by a capacitor 15 in a high-frequency fashion. Capacitor 15 comprises insulating film 16 of silica ($SiO_2$) or the like that is interposed between vertically superposed ends of high-frequency signal lines 1aa, 1ab. Capacitor 15 functions as a first insulating means for insulating another microwave circuit (not shown) connected to high-frequency signal line 1aa from high-frequency signal line 1ab in a DC manner. Alternatively, a coupling capacitor included in another microwave circuit connected to high-frequency signal line 1aa may be used as a first insulating means.

If high-frequency signal line 1a is open and is not connected to another microwave circuit, then capacitor 15 is not required, and an open end of high-frequency signal line 1a serves as the first insulating means.

Substrate 10 comprises a dielectric substrate such as a glass substrate or a semiconductor substrate such as an Si substrate, a GaAs substrate, or the like.

Post 12 including an electrically conductive material such as Al is disposed on the end of high-frequency signal line 1b.

Arm 13 has a proximal end fixedly mounted on an upper surface of post 12. Arm 13 extends from the upper surface of post 12 to a position above the end of high-frequency signal line 1ab. Arm 13 is made of an electrically conductive material which can restore its original shape even when bent, e.g., Al, Au, or Cu. Alternatively, arm 13 may be made of silicon (amorphous silicon) which is made electrically conductive by boron diffused therein.

Post 12 and arm 13 are jointly referred to as cantilever 11.

Post 12 and arm 13 may be in the form of a single member made of a single material as cantilever 11, as described later on with reference to FIGS. 5(A) through 5(E) and 6(A) through 6(D). Conversely, as shown in FIGS. 2(C) and 2(D), post 12 and arm 13 may not necessarily be made of one material.

Each of post 12 and arm 13 may not necessarily be made of a single material, but may be made of a plurality of materials. In such a case, not all the plural materials need to be electrically conductive, but the materials may include an insulating material. For example, for the reason of mechanical strength, arm 13 may be of a two-layer structure including an electrically conductive material of Al and an insulating material of $SiO_2$, and post 12 may include an insulating material to the extent that will not obstruct the propagation of high-frequency signals.

Insulating film 14 of $SiO_2$ or the like is disposed as a second insulating means on the lower surface of the distal end of arm 13 which confronts high-frequency signal line 1ab. Arm 13 is kept at a certain height by post 12, and insulating film 14 attached to arm 13 is normally spaced from high-frequency signal line 1ab. Stated otherwise, the height of post 13 is determined to keep insulating film 14 and high-frequency signal line 1ab normally spaced from each other.

Figure 3:
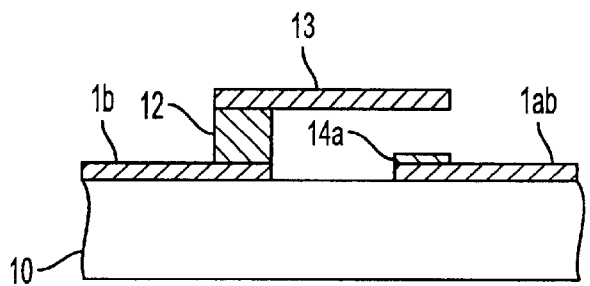
FIG. 3 is a cross-sectional view of a modification of a second insulating means.

The second insulating means serves to hold the voltage of high-frequency signal line 1ab at the voltage level of a control signal, described later on, in coaction with capacitor 15 when high-frequency signal lines 1a, 1b are conducted. Therefore, as shown in FIG. 3, the second insulating means may comprise insulating film 14a disposed on the upper surface of the end of high-frequency signal line 1ab. Alternatively, insulating films 14, 14a may be combined into the second insulating means.

The voltage level of high-frequency signal line 1ab does not need to be in full agreement with the voltage level of the control signal. The voltage of high-frequency signal line 1ab may be held at such a level that cantilever 11 can operate based on the control signal.

As shown in FIG. 2(A), control device 3 is connected to high-frequency signal line 1ab by first control signal line 2. Control device 3 serves to output a control signal represented by DC voltage level variations. As described later on, connected states of high-frequency signal lines 1a, 1b are changed based on the control signal.

Operation of the micromachine switch shown in FIGS. 2(A) through 2(D) will be described below. It is assumed that the control signal is represented by positive voltage ON/OFF levels.

As described above, insulating film 14 on the distal end of arm 13 is normally spaced from high-frequency signal line 1ab, with no high-frequency connection provided between high-frequency signal lines 1ab, 1b.

When a positive voltage is applied from control device 3 via first control signal line 2 to high-frequency signal line 1ab, positive charges are generated on the upper surface of high-frequency signal line 1ab, and negative charges are developed on the lower surface of the distal end of arm 13 which confronts high-frequency signal line 1ab due to electrostatic induction, producing attractive forces between high-frequency signal line 1ab and arm 13. Under the attractive forces, arm 13 is curved toward substrate 10 until insulating film 14 on the distal end of arm 13 is brought into contact with high-frequency signal line 1ab, whereupon high-frequency signal lines 1ab, 1b are connected to each other in a high-frequency fashion by a capacitive coupling. Since high-frequency signal lines 1aa, 1ab are also connected to each other in a high-frequency fashion by a capacitive coupling, high-frequency signal RF flows from high-frequency signal line 1aa to high-frequency signal line 1b at a low loss.

At this time, high-frequency signal line 1ab is insulated from high-frequency signal lines 1aa, 1b and also other microwave circuits (not shown) connected to high-frequency signal lines 1aa, 1b in a DC and low-frequency fashion by insulating films 16, 14. Therefore, the control signal applied to high-frequency signal line 1ab does not leak to the other microwave circuits, and the DC voltage level on high-frequency signal line 1ab is maintained.

When the application of the voltage to high-frequency signal line 1ab is stopped, attractive forces between high-frequency signal line 1ab and arm 13 are eliminated. Therefore, arm 13 restores its original shape, causing insulating film 14 to be spaced from high-frequency signal line 1ab. Thus, the high-frequency connection between high-frequency signal lines 1ab, 1b is broken.

Figure 4:
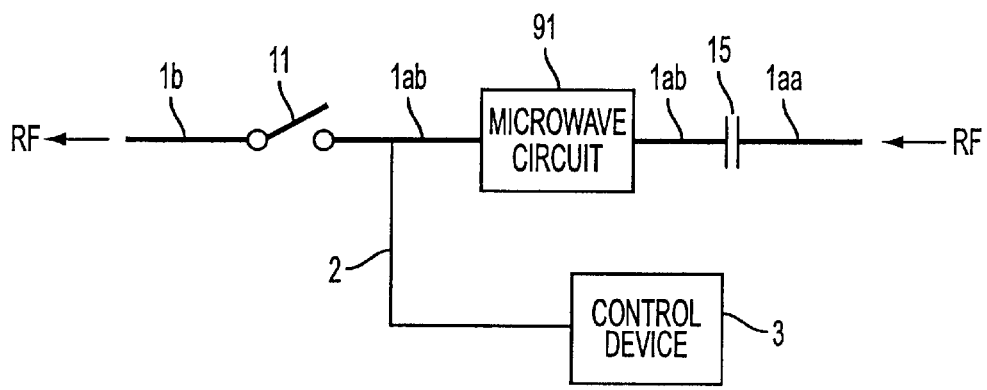
FIG. 4 is a circuit diagram showing a modification of the micromachine switch shown in FIGS. 2(A) through 2(D)

High-frequency signal line 1ab may be arranged to hold the voltage level of the control signal, and may have another microwave circuit 91 somewhere along its length, as shown in FIG. 4.

Dimensions of various parts of the micromachine switch will be described below with reference to FIG. 2(D). It is assumed that arm 13 is made of Al and a voltage of 40 V is applied as the control signal.

In order to obtain a desired spring constant in view of the mechanical strength of arm 13, the thickness t of arm 13 is determined to be about 0.5 μm.

The height H in a normal state from the upper surface of high-frequency signal line 1ab to insulating film 14 on arm 13 is about 5 μm. The area in which high-frequency signal line 1ab and arm 13 face each other is about 0.01 mm².

With the various dimensions thus set, the micromachine switch that operates as described above is realized. The above dimensions of the various parts are given by way of example only, and are not of a limitative nature.

A process of manufacturing the micromachine switch shown in FIGS. 2(A) through 2(D) will be described below. FIGS. 5(A) through 5(E) and 6(A) through 6(D) show major steps of the process of manufacturing the micromachine switch.

Figure 5A:
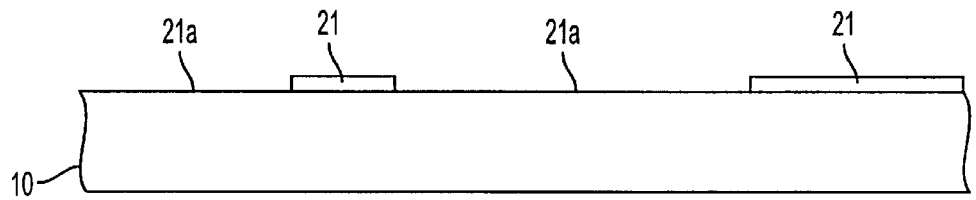
FIGS. 5(A) through 5(E) are cross-sectional views of major steps of a process of manufacturing the micromachine switch shown in FIGS. 2(A) through 2(D)

First, substrate 10 is coated with a photoresist. The photoresist is then patterned according to the known photolithographic technology to form resist pattern 21 having grooves 21a in desired positions. FIG. 5(A) show grooves 21a where high-frequency signal lines 1ab, 1b will be formed in a subsequent step. A groove is also formed in a position where first control signal line 2 will be formed.

Figure 5B:
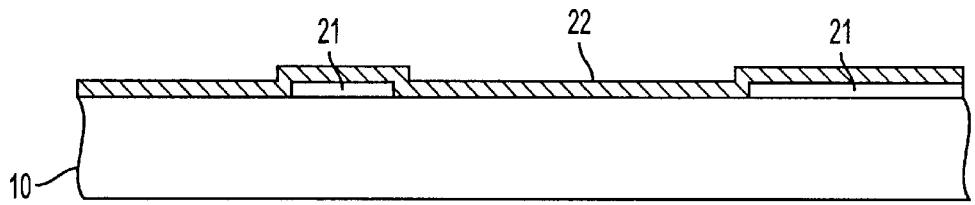

Then, as shown in FIG. 5(B), metal film 22 of Al or the like is deposited on the entire surface of substrate 10 by sputtering.

Figure 5C:
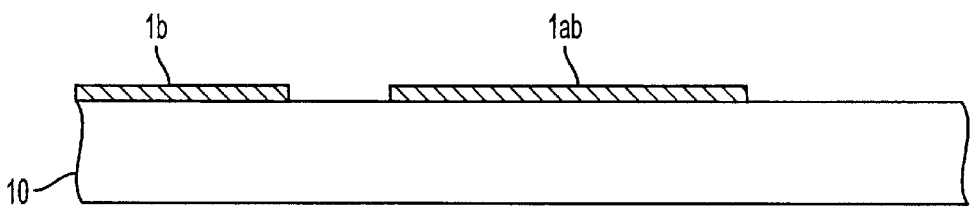

Resist pattern 21 is then dissolved away by an organic solvent to selectively remove (lift off) metal film 22 on resist pattern 21, thus forming high-frequency signal lines 1ab, 1b on substrate 10, as shown in FIG. 5(C). At this time, first control signal line 2 connected to high-frequency signal line 1ab is also formed.

Figure 5D:
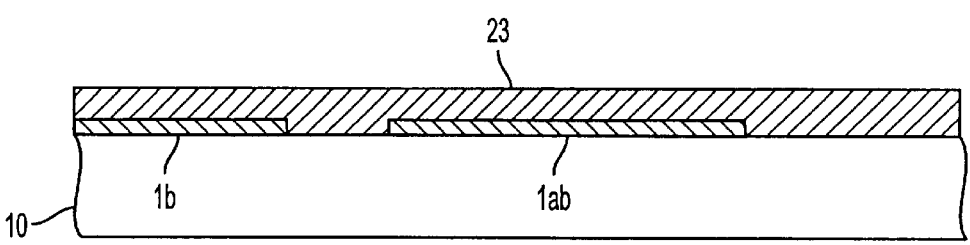

Then, as shown in FIG. 5(D), the entire surface is coated with photosensitive polyimide and then dried to form sacrificial layer 23 having a thickness ranging from 5 to 6 μm on the entire surface of substrate 10.

Figure 5E:
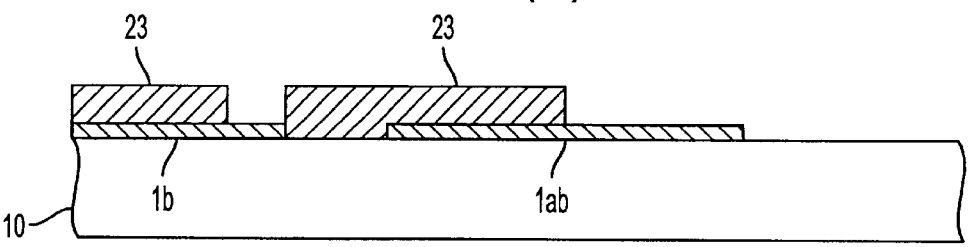

As shown in FIG. 5(E), sacrificial layer 23 is patterned according to the known photolithographic technology to remove unwanted portions thereof, leaving sacrificial layer 23 from the gap between high-frequency signal lines 1ab, 1b to an end of high-frequency signal line 1ab (closer to high-frequency signal line 1b), i.e., in a region where arm 13 shown in FIGS. 2(A) through 2(D) will be formed. In FIG. 5(E), sacrificial layer 23 is also left in a region on high-frequency signal line 1b except its end.

The assembly is then heated at a temperature ranging from 200° C. to 300° C., hardening sacrificial layer 23 that has been left.

Figure 6A:
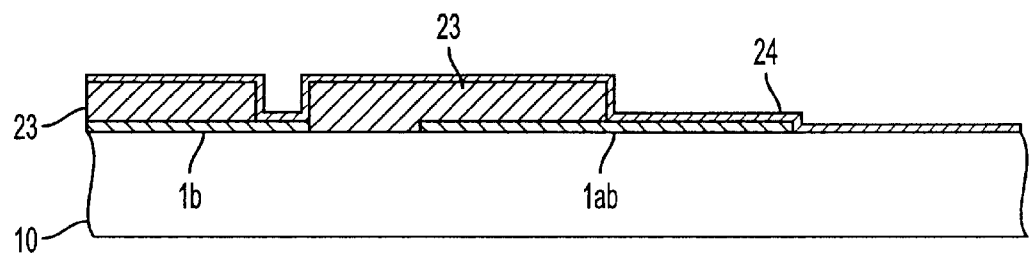
FIGS. 6(A) through 6(D) are cross-sectional views of steps following the steps shown in FIGS. 5(A) through 5(E)

Then, as shown in FIG. 6(A), a layer of $SiO_2$ is deposited on the entire surface formed so far by CVD or sputtering, forming insulating film 24 having a thickness ranging from 0.01 to 0.3 μm.

Figure 6B:
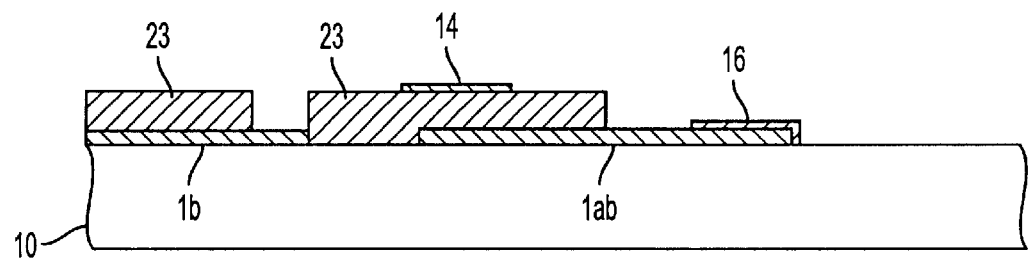

Thereafter, insulating film 24 is removed, except for some regions, according to the known photolithographic and etching technology. As a result, as shown in FIG. 6(B), insulating film (first insulating film) 14 is formed on a portion of sacrificial layer 23 which confronts one end of high-frequency signal line 1ab, and insulating film (second insulating film) 16 is formed on the other end of high-frequency signal line 1ab.

The photoresist that has been used is removed by an alkaline solvent.

Figure 6C:
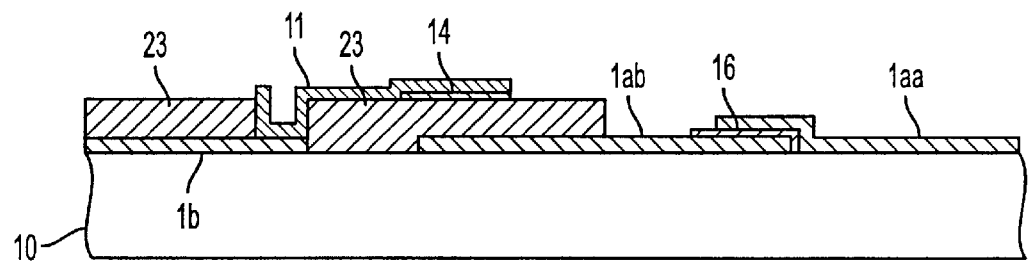

Then, as shown in FIG. 6(C), cantilever 11 made of Al or the like which extends from the end of high-frequency signal line 1b to the upper surface of insulating film 14 on sacrificial layer 23, and high-frequency signal line 1aa made of Al or the like which extends from the upper surface of insulating film 16 over substrate 10 are simultaneously formed by a lift-off process.

Figure 6D:
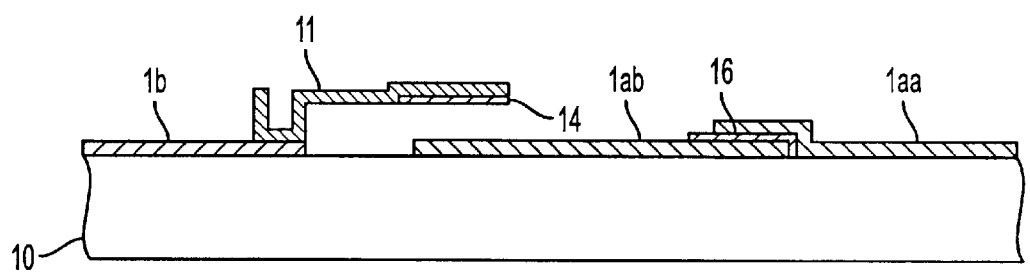

Finally, as shown in FIG. 6(D), only sacrificial layer 23 is selectively removed by a dry etching process using a plasma of oxygen gas, thus completing a micromachine switch (in FIGS. 5(A) through 5(E) and 6(A) through 6(D), 1b represents a first high-frequency signal line, 1ab a third high-frequency signal line, and 1aa a fourth high-frequency signal line).

In the above process, post 12 and arm 13 which jointly make up cantilever 11 are formed in one step. However, post 12 and arm 13 may be formed in separate steps.

Hereafter the structures of the micromachine switch shown in FIGS. 2(A) through 2(D) and the conventional micromachine switch shown in FIGS. 1(A) through 1(D) are compared to each other.

Cantilever 11 shown in FIGS. 2(A) through 2(D) has both a function as a movable contact and a function as a support means for supporting the movable contact. Therefore, cantilever 11 functionally corresponds to contact 115, arm 113, and post 112 shown in FIGS. 1(A) through 1(D), and the former is of a simpler structure than the latter.

Cantilever 11, which is constructed of post 12 and arm 13, can be formed with utmost ease because post 12 and arm 13 are formed in one step as shown in FIG. 6(C).

With the micromachine switch shown in FIGS. 2(A) through 2(D), since the control signal is applied to high-frequency signal line 1ab to control operation of cantilever 11, lower electrode 111 and upper electrode 114 which have heretofore been required are no longer necessary. For this reason, the micromachine switch shown in FIGS. 2(A) through 2(D) is thus further simple in structure.

While insulating films 14, 16 are required to insulate high-frequency signal line 1ab from other microwave circuits in a DC fashion, the conventional micromachine switch also needs an insulating film to be formed on the lower surface of contact 115 if it is of the capacitive coupling type. Furthermore, as shown in FIGS. 6(B) and 6(C), because insulating film 16 can be formed in the same step as with insulating film 14, and also because high-frequency signal line 1aa can be formed in the same step as with cantilever 11, the manufacturing process is not complicated.

As described above, the micromachine switch is realized which can easily be manufactured because of the simple structure.

Figure 7A:
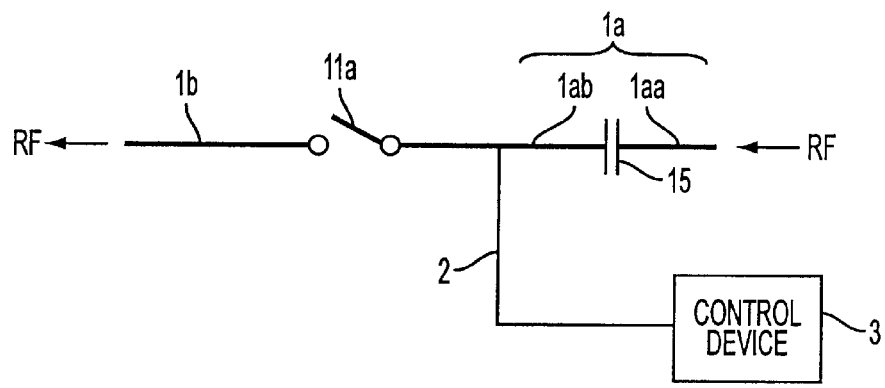
FIGS. 7(A) and 7(B) are a circuit diagram and a cross-sectional view showing a modification of the micromachine switch shown in FIGS. 2(A) through 2(D)
Figure 7B:
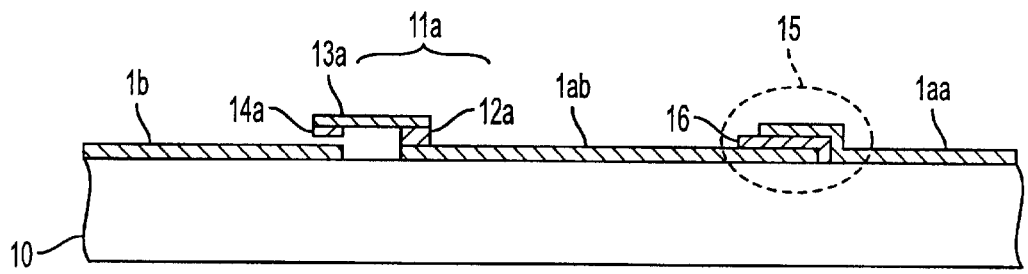

In FIGS. 2(A) through 2(D) and FIGS. 6(A) through 6(D), cantilever 11 is fixed in position at an end closer to high-frequency signal line 1b. However, as shown in FIGS. 7(A) and 7(B), cantilever 11 may be fixed in position at an end closer to high-frequency signal line 1a. In this case, first control signal line 2 is also connected to high-frequency signal line 1ab. Therefore, though a voltage as a control signal is applied to cantilever 11, high-frequency signal lines 1a, 1b can be closed and opened in the same principles as those shown in FIGS. 2(A) through 2(D).

The micromachine switch shown in FIGS. 7(A) and 7(B) can be manufactured in the same steps as those shown in FIGS. 5(A) through 5(E) and 6(A) through 6(D). In FIGS. 7(A) and 7(B), 1a represents a first high-frequency signal line, 1b a second high-frequency signal line, 1ab a fifth high-frequency signal line, and 1aa a sixth high-frequency signal line.

2nd Embodiment

Figure 8:
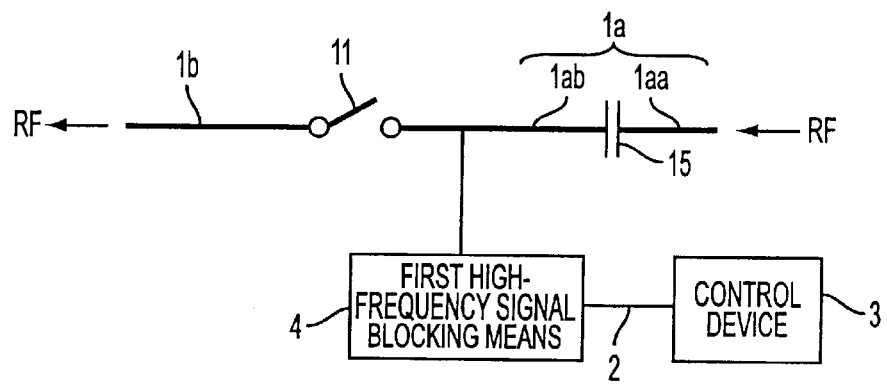
FIG. 8 is a circuit diagram showing a micromachine switch according to a second embodiment of the present invention.

FIG. 8 is a circuit diagram showing a micromachine switch according to a second embodiment of the present invention. Those parts shown in FIG. 8 which are identical to those shown in FIGS. 2(A) through 2(D) are denoted by identical reference marks, and will not be described in detail below.

In the micromachine switch shown in FIG. 8, first high-frequency signal blocking means 4 is connected to first control signal line 2 of the micromachine switch shown in FIGS. 2(A) through 2(D). First high-frequency signal blocking means 4 serves to block the passage of high-frequency signal RF. High-frequency signal RF flowing through high-frequency signal lines 1a, 1b is prevented from flowing into control device 3, thus reducing the insertion loss of the micromachine switch.

With the micromachine switch shown in FIGS. 2(A) through 2(D), depending on the arrangement of first control signal line 2, the electric power leaking from first control signal line 2 may be coupled to other high-frequency signal lines, tending to adversely affect the overall characteristics of the circuit and cause resonance. First high-frequency signal blocking means 4 that is connected to first control signal line 2 is effective to prevent an electromagnetic coupling from first control signal line 2 to other high-frequency signal lines, thereby improving the high-frequency characteristics of a circuit where the micromachine switch is used.

Arrangements of first high-frequency signal blocking means 4 shown in FIG. 8 will be described below with reference to FIGS. 9(A) and 9(B) through 13(A) and 13(B).

Figure 9A:
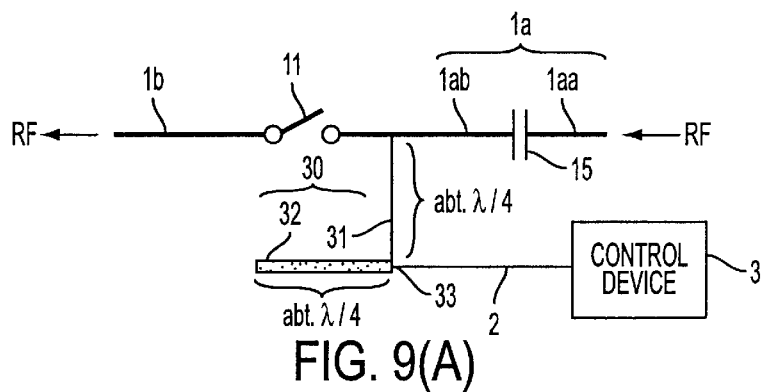
FIGS. 9(A) and 9(B), are a circuit diagram and a plan view showing a first arrangement of a first high-frequency signal blocking means.
Figure 9B:
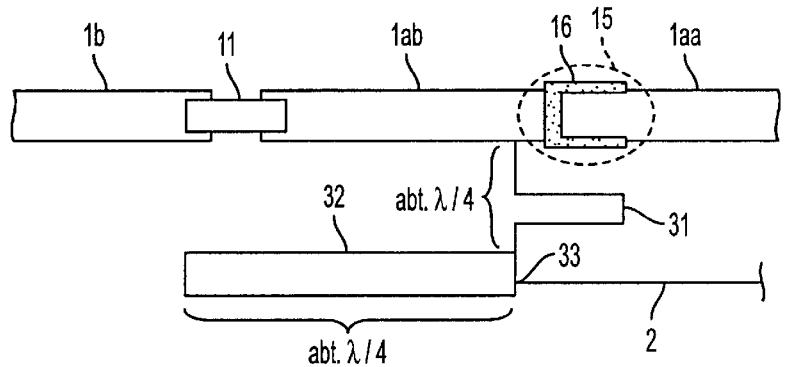

A first arrangement of first high-frequency signal blocking means 4 will be described below. FIGS. 9(A) and 9(B) show such a first arrangement. FIG. 9(A) is a circuit diagram of the first arrangement, and FIG. 9(B) is a plan view of the first arrangement.

The first arrangement of first high-frequency signal blocking means 4 comprises filter 30 composed of high-impedance $\lambda/4$ line 31 and low-impedance $\lambda/4$ line 32.

High-impedance $\lambda/4$ line 31 has a line length of about $\lambda/4$ ($\lambda$ represents the wavelength of high-frequency signal RF), and has a larger characteristic impedance than high-frequency signal lines 1a, 1b. Low-impedance $\lambda/4$ line 32 has a line length of about $\lambda/4$, and has a smaller characteristic impedance than high-impedance $\lambda/4$ line 31.

The values of the characteristic impedances of these lines 31, 32 are determined depending on the characteristic impedances of high-frequency signal lines 1a, 1b. For example, if the characteristic impedances of high-frequency signal lines 1a, 1b are of a general value of 50Ω, then the characteristic impedance of high-impedance $\lambda/4$ line 31 should desirably be in the range from 70 to 200Ω (1.4 to 4 times the characteristic impedances of high-frequency signal lines 1a, 1b), and the characteristic impedance of low-impedance $\lambda/4$ line 32 should desirably be in the range from 20 to 40Ω (0.4 to 0.8 times the characteristic impedances of high-frequency signal lines 1a, 1b).

High-impedance $\lambda/4$ line 31 has an end connected to high-frequency signal line 1ab and the other end to an end of low-impedance $\lambda/4$ line 32 whose other end is open. First control signal line 2 of a high impedance is connected to the other end of high-impedance $\lambda/4$ line 31, i.e., the junction 33 between lines 31, 32.

The principles of operation of filter 30 will be described below.

As described above, the other end of low-impedance $\lambda/4$ line 32 is open. Therefore, since the impedance as viewed from the junction 33 spaced from the other end of low-impedance $\lambda/4$ line 32 over the length $\lambda/4$ toward low-impedance $\lambda/4$ line 32 is 0Ω, the circuit is equivalent to being grounded at junction 33 in a high-frequency fashion. Even with first control signal line 2 connected parallel to junction 33, the impedance at junction 33 remains to be 0Ω and does not affect the behavior of high-frequency signals.

Because high-frequency signal line 1ab is connected to junction 33 via high-impedance $\lambda/4$ line 31 having the length $\lambda/4$, the impedance as viewed from high-frequency signal line 1ab toward filter 30 is infinitely large (∞Ω). Therefore, since no high-frequency signal flows from high-frequency signal line 1ab toward filter 30, the circuit is equivalent to being devoid of filter 30 and first control signal line 2 in a high-frequency fashion.

The structure of filter 30 described above is generally called a bias T. Filter 30 operates as a band-reject filter as it rejects only a certain band of frequencies.

Figure 10A:
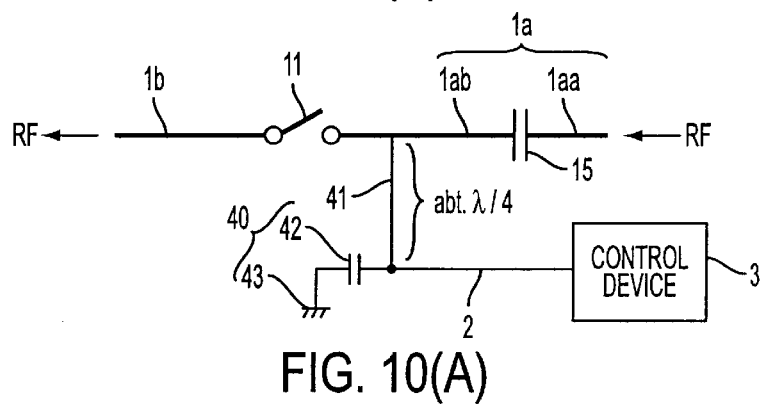
FIGS. 10(A) and 10(B) are a circuit diagram and a plan view showing a second arrangement of a first high-frequency signal blocking means.
Figure 10B:
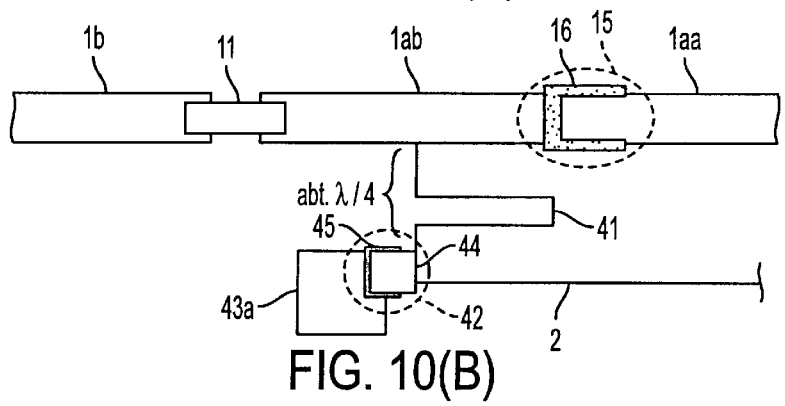

A second arrangement of first high-frequency signal blocking means 4 will be described below. FIGS. 10(A) and 10(B) show such a second arrangement. FIG. 10(A) is a circuit diagram of the second arrangement, and FIG. 10(B) is a plan view of the second arrangement.

The second arrangement of first high-frequency signal blocking means 4 comprises filter 40 composed of high-impedance $\lambda/4$ line 41, capacitor 42, and ground 43.

As shown in FIG. 10(A), high-impedance $\lambda/4$ line 41 has an end connected to high-frequency signal line 1ab and the other end to an electrode of capacitor 42. The other electrode of capacitor 42 is connected to ground 43. First control signal line 2 is connected to the electrode of capacitor 42 to which high-impedance $\lambda/4$ line 41 is connected.

As shown in FIG. 10(B), capacitor 42 comprises electrode 44 serving as an end thereof, grounded electrode 43a as the other end thereof, and insulating film 45 interposed between electrodes 44, 43a.

High-impedance $\lambda/4$ line 41 has a high characteristic impedance and a light length of about $\lambda/4$ ($\lambda$ represents the wavelength of high-frequency signal RF). The value of the characteristic impedance of high-impedance $\lambda/4$ line 41 is determined in the same manner as the high-impedance $\lambda/4$ line 31 shown in FIGS. 9(A) and 9(B).

The principles of operation of filter 40 will be described below.

Capacitor 42 has a sufficient capacitance, and the junction between high-impedance $\lambda/4$ line 41 and capacitor 42 is equivalent to being grounded in a high-frequency fashion, and has an impedance of 0Ω. As with the arrangement shown in FIGS. 9(A) and 9(B), the impedance at junction does not affect the behavior of high-frequency signals even with first control signal line 2 connected to junction.

Because high-frequency signal line 1ab is connected to capacitor 42 via high-impedance $\lambda/4$ line 41 having the length $\lambda/4$, the impedance as viewed from high-frequency signal line 1ab toward filter 40 is infinitely large (∞Ω). Therefore, high-frequency signal RF does not flow from high-frequency signal line 1ab toward filter 40.

Filter 40 described above is also one type of a bias T, and operates as a band-reject filter.

Figure 11A:
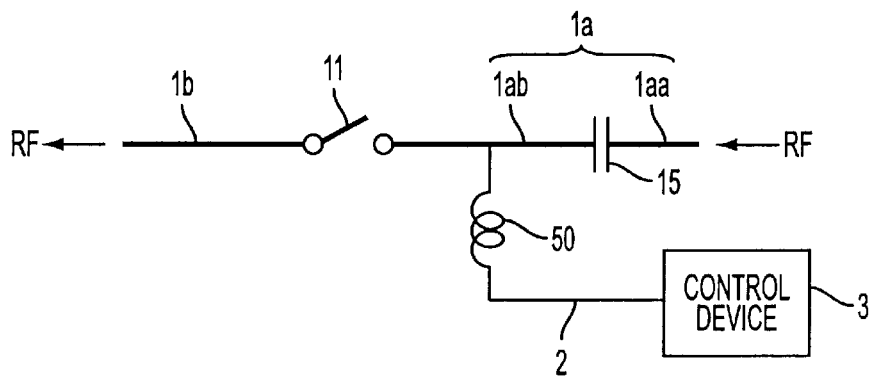
FIGS. 11(A) through 11(C) are a circuit diagram and plan views showing a third arrangement of a first high-frequency signal blocking means.
Figure 11B:
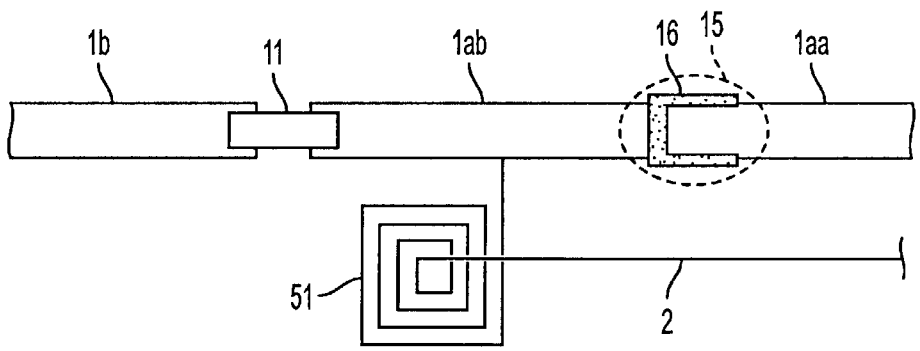
Figure 11C:
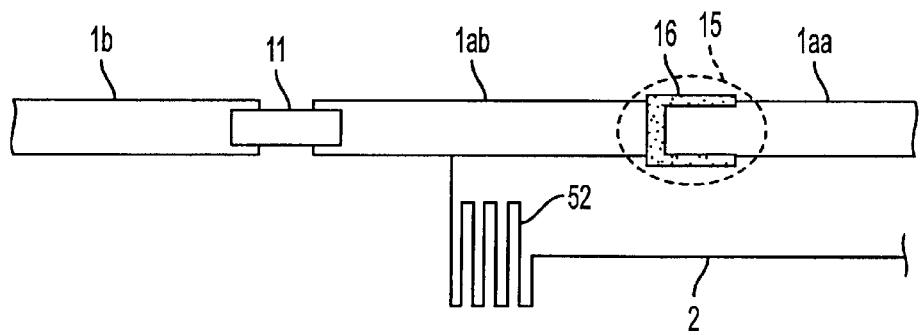

A third arrangement of first high-frequency signal blocking means 4 will be described below. FIGS. 11(A), 11(B), and 11(C) show such a third arrangement. FIG. 11(A) is a circuit diagram of the third arrangement, and FIGS. 11(B) and 11(B) are plan views of the third arrangement.

As shown in FIG. 11(A), filter 50 comprising an inductive element may be used as first high-frequency signal blocking means 4. More specifically, spiral inductor 51 shown in FIG. 11(B) or meander-line inductor 52 may be used as first high-frequency signal blocking means 4.

These inductive circuit elements exhibit a low impedance in a DC and low-frequency range, but a high impedance in a high-frequency range. Therefore, these inductive circuit elements operate as a low-pass filter, with a cut-off frequency being lower than the frequency of high-frequency signal RF.

Not only such a distributed-constant element, but also a lumped-constant element such as a coil, may be used as an externally added device.

Further, as a low-pass filter, the other type filter such as one comprising multistage lines cascaded, each line having a different characteristic impedance to each other can be also utilized.

Figure 12A:
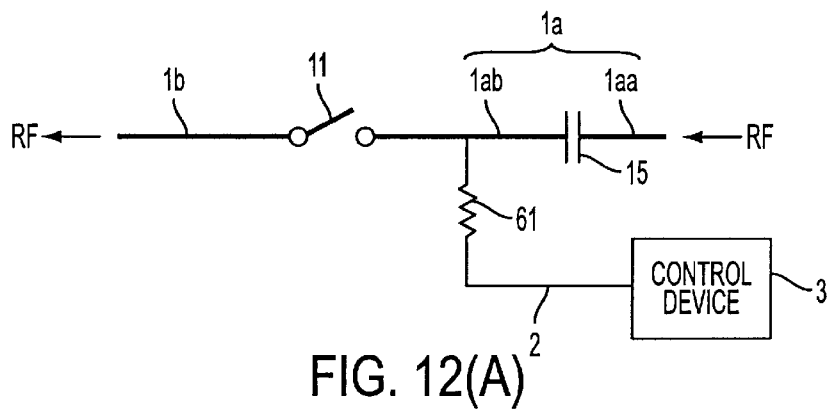
FIGS. 12(A) and 12(B) are a circuit diagram and a plan view showing a fourth arrangement of a first high-frequency signal blocking means.
Figure 12B:
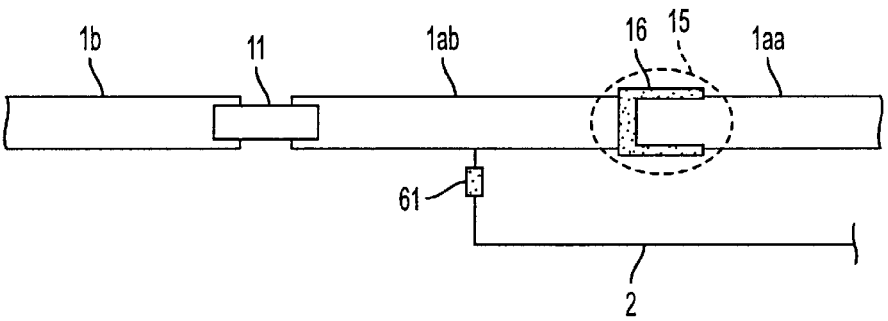

A fourth arrangement of first high-frequency signal blocking means 4 will be described below. FIGS. 12(A) and 12(B) show such a fourth arrangement. FIG. 12(A) is a circuit diagram of the fourth arrangement, and FIG. 12(B) is a plan view of the fourth arrangement.

As shown in FIG. 12(A), resistive element 61 may be inserted as first high-frequency signal blocking means 4 in series in first control signal line 2 to prevent high-frequency signal RF from flowing into first control signal line 2.

The value of the impedance of resistive element 61 may be at least twice the characteristic impedances of high-frequency signal lines 1a, 1b, but should preferably be at least twenty times the characteristic impedances of high-frequency signal lines 1a, 1b. Specifically, if characteristic impedances of high-frequency signal lines 1a, 1b are of a general value of 50Ω, then the impedance of resistive element 61 is generally determined to be 1 kΩ or higher.

With the impedance of resistive element 61 being thus determined, since it does not match the impedances of high-frequency signal lines 1a, 1b, high-frequency signal RF is prevented from leaking into first control signal line 2.

Resistive element 61 may be produced by a process of forming a thin-film resistive element according to vacuum evaporation or sputtering or a process of using a semiconductor n or n+ layer.

If filters 30, 40, 50 shown in FIGS. 9(A) and 9(B) through 11(A), 11(B), 11(C) are added to prevent high-frequency signal RF from leaking into first control signal line 2, then the micromachine switch has increased overall dimensions. Use of resistive element 61 shown in FIGS. 12(A) and 12(B), however, is effective to prevent high-frequency signal RF from leaking into first control signal line 2 without increasing overall dimensions.

Figure 13A:
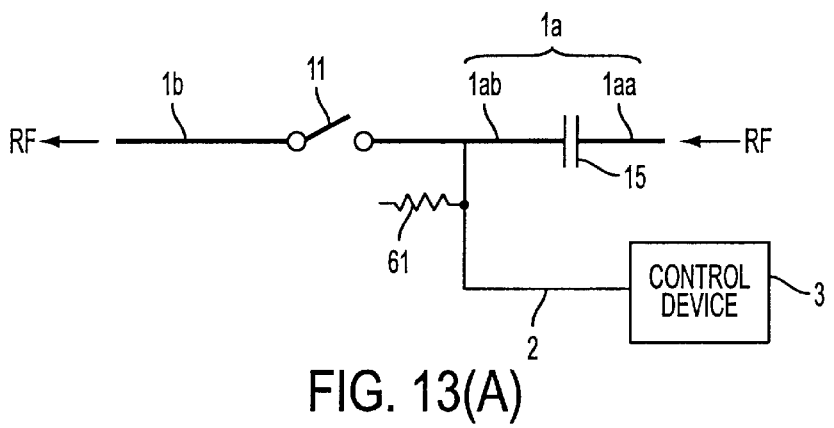
FIGS. 13(A) and 13(B) are a circuit diagram and a plan view showing a fifth arrangement of a first high-frequency signal blocking means.
Figure 13B:
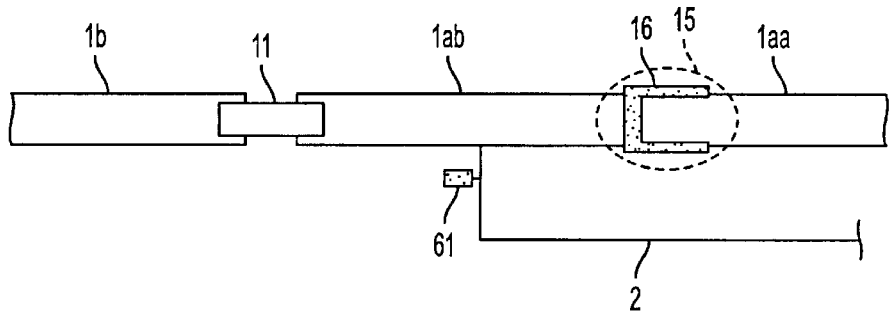

As shown in FIGS. 13(A) and 13(B), resistive element 61 may be connected parallel to first control signal line 2, i.e., one end of resistive element 61 may be connected to first control signal line 2 and the other end may be open. Such an arrangement is also effective to prevent resonance from occurring.

In FIGS. 8 through 13(A) and 13(B), first high-frequency signal blocking means 4 is applied to the micromachine switch shown in FIGS. 2(A) through 2(D). However, first high-frequency signal blocking means 4 may be applied to the micromachine switch shown in FIGS. 7(A) and 7(B) to offer the same advantageous effects.

3rd Embodiment

Figure 14:
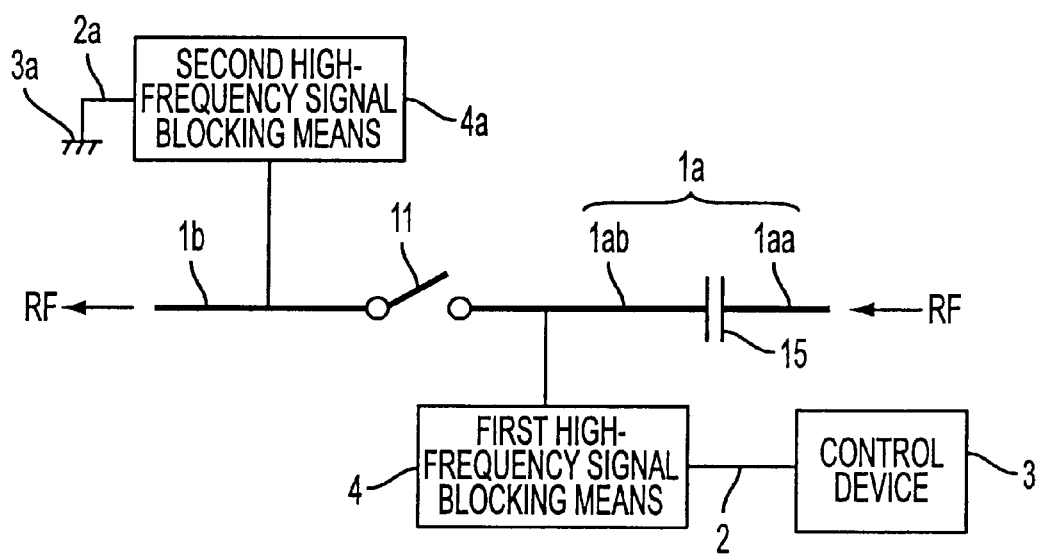
FIG. 14 is a circuit diagram showing a micromachine switch according to a third embodiment of the present invention.

FIG. 14 is a circuit diagram showing a micromachine switch according to a third embodiment of the present invention.

The micromachine switch shown in FIG. 14 is similar to the micromachine switch shown in FIG. 8 except that cantilever 11 is grounded through high-frequency signal line 1b, second high-frequency signal blocking means 4a, and second control signal line 2a. As with first high-frequency signal blocking means 4, second high-frequency signal blocking means 4a serves to block the passage of high-frequency signal RF.

With cantilever 11 thus grounded, electric charges that are generated on cantilever 11 by electrostatic induction when a voltage starts being applied to high-frequency signal line 1ab can quickly be charged, and the stored electric charges can quickly be discharged when the application of the voltage is stopped. Therefore, the micromachine switch performs stable switching operation and has an increased switching speed.

Since second high-frequency signal blocking means 4a for blocking the passage of high-frequency signal RF is connected to second control signal line 2a, high-frequency signal RF does not leak from high-frequency signal line 1b to second control signal line 2a. Therefore, the micromachine switch does not suffer the problems of an increased insertion loss and a high-frequency characteristic degradation.

Filters 30, 40, 50 and resistive element 61 for use as first high-frequency signal blocking means 4 may be used as second high-frequency signal blocking means 4a.

Figure 15A:
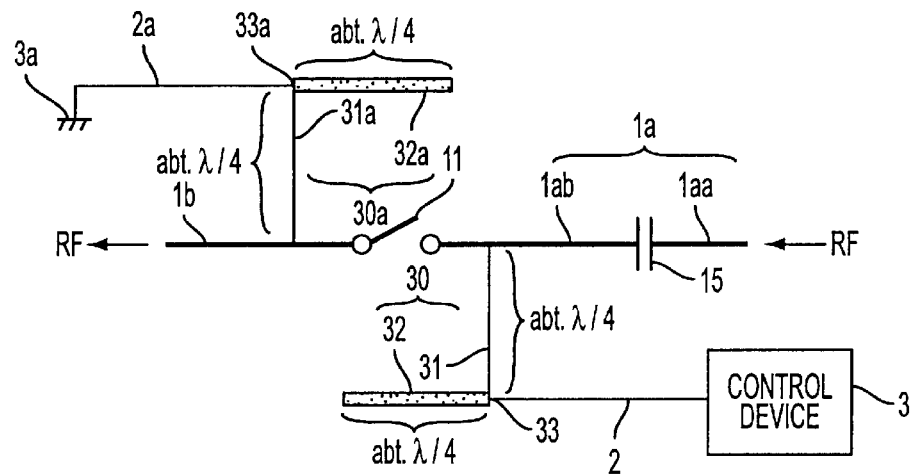
FIGS. 15(A) and 15(B) are a circuit diagram and a plan view showing a micromachine switch where both first and second high-frequency signal blocking means comprise respective filters which are the same as filter 30.
Figure 15B:
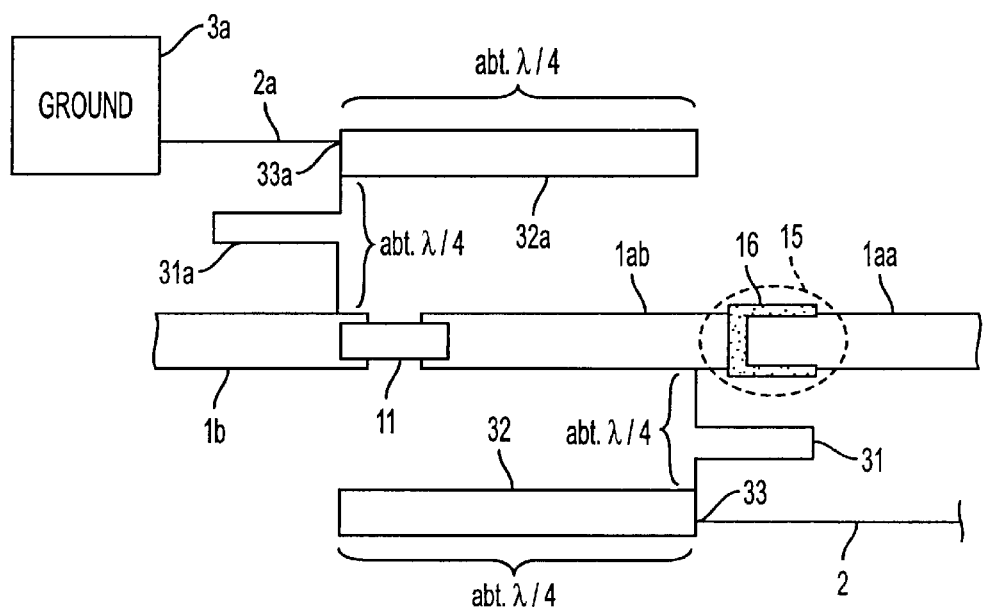

FIGS. 15(A) and 15(B) show a micromachine switch where second high-frequency signal blocking means 4a comprise filter 30a which is the same as filter 30. High-impedance λ/4 line 31a corresponds to high-impedance λ/4 line 31, and has an end connected to high-impedance signal line 1b. Low-impedance λ/4 line 32a corresponds to low-impedance λ/4 line 32, and has an end connected to the other end of high-impedance λ/4 line 31a. The other end of low-impedance λ/4 line 32a is open. Junction 33a between lines 31a, 32a is connected to ground 3a through second control signal line 2a.

Figure 16A:
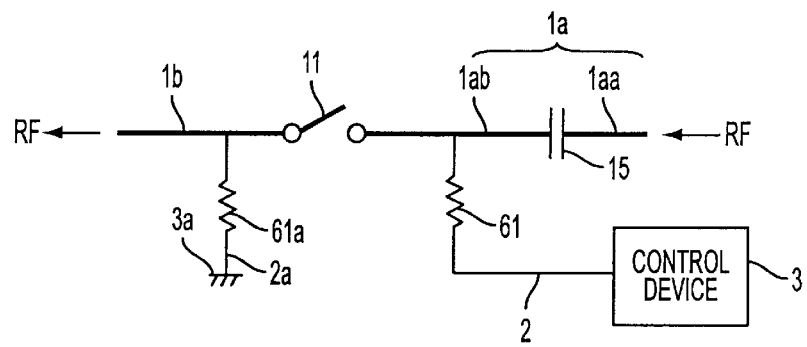
FIGS. 16(A) and 16(B) are a circuit diagram and a plan view showing a micromachine switch where both first and second high-frequency signal blocking means comprise respective resistive elements which are the same as resistive element 61.
Figure 16B:
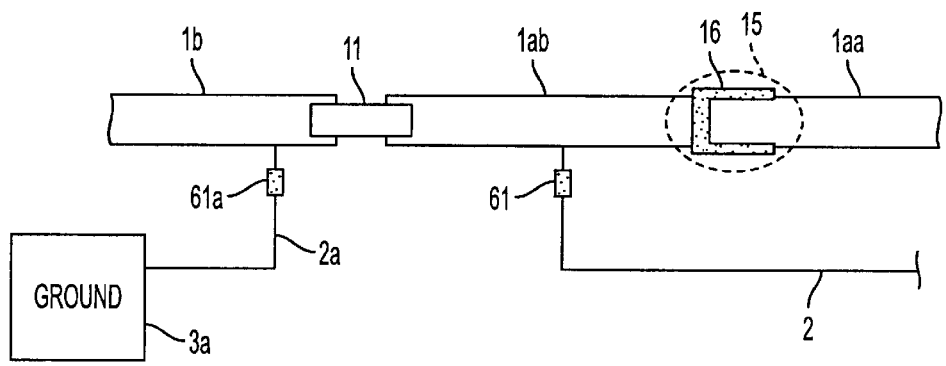

FIGS. 16(A) and 16(B) show a micromachine switch where second high-frequency signal blocking means 4a comprise resistive elements 61a which is the same as resistive element 61. Resistive element 61a is inserted in series in second control signal line 2a which is connected to ground 3a.

Figure 17A:
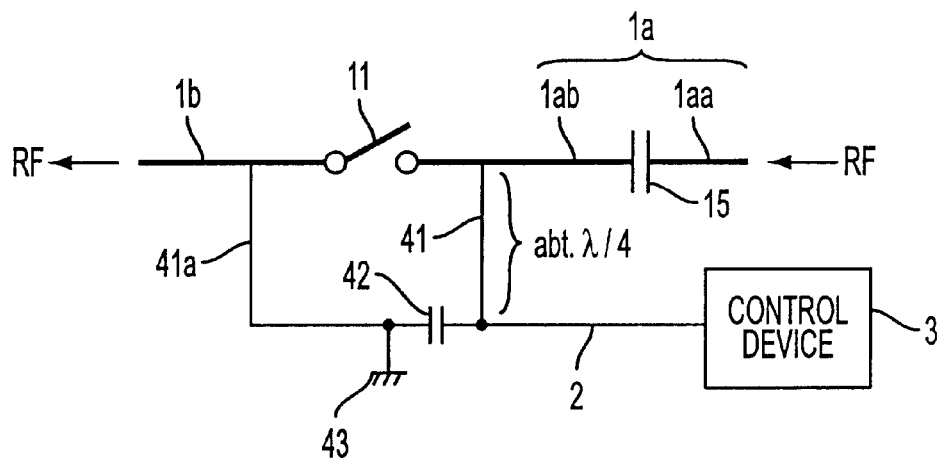
FIGS. 17(A) and 17(B) are a circuit diagram and a plan view showing a micromachine switch where both first and second high-frequency signal blocking means comprise respective filters which are the same as filter 40.
Figure 17B:
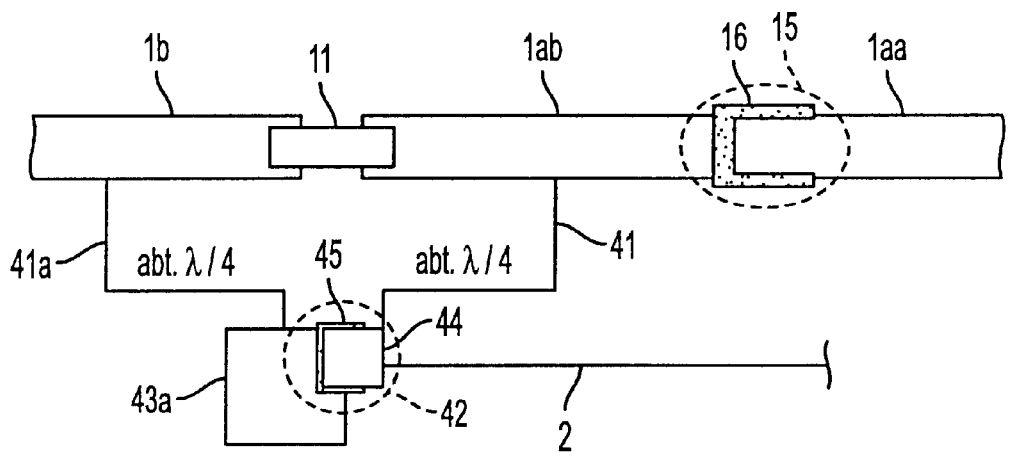

If both first and second high-frequency signal blocking means 4, 4a comprise filters which are the same as filter 40, then first and second high-frequency signal blocking means 4, 4a can be simplified in structure. FIGS. 17(A) and 17(B) show a micromachine switch where both first and second high-frequency signal blocking means 4, 4a comprise respective filters which are the same as filter 40. FIG. 17(A) is a circuit diagram of the micromachine switch, and FIG. 17(B) is a plan view of the micromachine switch.

As shown in FIG. 17(B), the micromachine switch can be realized by connecting high-frequency signal line 1b of the micromachine switch shown in FIG. 10(B) to ground electrode 43a through high-impedance λ/4 line 41a. High-impedance λ/4 line 41a is of a structure which is the same as high-impedance λ/4 line 41 that connects high-frequency signal line 1ab and electrode 44 to each other.

In FIG. 17(A), high-impedance λ/4 line (first high-impedance line) 41, capacitor 42, and ground 43 jointly make up first high-frequency signal blocking means 4.

High-impedance λ/4 line (second high-impedance line) 41a connected to ground 43 provides second high-frequency signal blocking means 4a.

By thus sharing components between first and second high-frequency signal blocking means 4, 4a, the micromachine switch is reduced in size.

In FIGS. 15(A) and 15(B) through 17(A) and 17(B), first high-frequency signal blocking means 4 and second high-frequency signal blocking means 4a are identical in structure to each other. However, first high-frequency signal blocking means 4 and second high-frequency signal blocking means 4a may be different in structure from each other.

Although not shown, high-frequency signal line 1b of the micromachine switch shown in FIGS. 7(A) and 7(B) may be ground through second control signal line 2a, and second high-frequency signal blocking means 4a may be connected to second control signal line 2a thus grounded.

4th Embodiment

Figure 18:
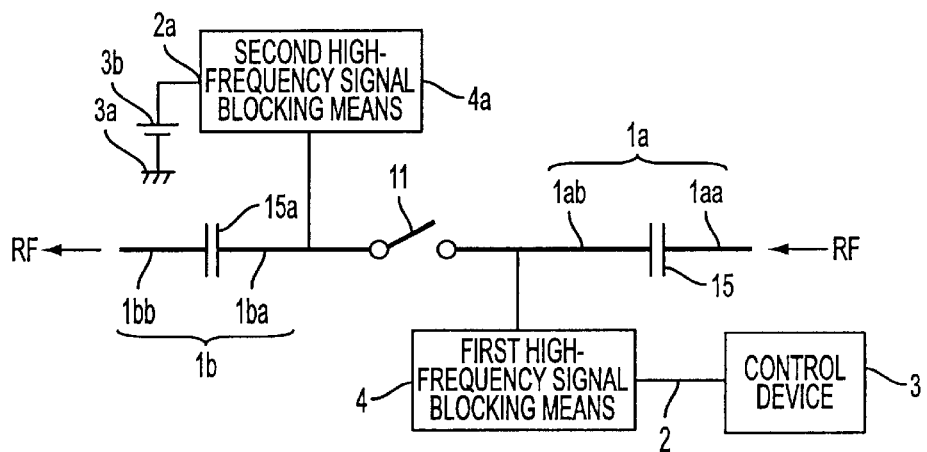
FIG. 18 is a circuit diagram showing a micromachine switch according to a fourth embodiment of the present invention.

FIG. 18 is a circuit diagram showing a micromachine switch according to a fourth embodiment of the present invention. Those parts shown in FIG. 18 which are identical to those shown in FIG. 14 are denoted by identical reference marks, and will not be described in detail below.

The micromachine switch shown in FIG. 18 differs from the micromachine switch shown in FIG. 14 in that capacitor 15a is inserted in high-frequency signal line 1b, and constant-voltage source 3b is connected to a junction between an end of high-frequency signal line 1b and capacitor 15a, i.e., to high-frequency signal line 1ba via second high-frequency signal blocking means 4a and second control signal line 2a.

As with capacitor 15, capacitor 15a comprises an insulating film of silica ($SiO_2$) or the like that is interposed between vertically superposed ends of high-frequency signal lines 1ba, 1bb. Capacitor 15a functions as a third insulating means for insulating another microwave circuit (not shown) connected to high-frequency signal line 1bb from high-frequency signal line 1ba in a DC manner. Alternatively, a coupling capacitor included in another microwave circuit connected to high-frequency signal line 1bb may be used as a third insulating means.

If high-frequency signal line 1b is open, then an open end of high-frequency signal line 1b serves as the third insulating means.

Capacitor 15a and insulating film 14 on cantilever 11 insulate high-frequency signal line 1ba from high-frequency signal lines 1a, 1bb and other microwave circuits (not shown) connected to high-frequency signal lines 1a, 1bb in a DC manner. Therefore, the DC voltage on high-frequency signal line 1ba is kept at an output voltage level of constant-voltage source 3b.

The output voltage from constant-voltage source 3b has a polarity opposite to the control signal outputted from control device 3. If the control signal is represented by positive voltage ON/OFF levels, then constant-voltage source 3b outputs a negative constant voltage.

Since cantilever 11 needs to operate based on the control signal, the output voltage from constant-voltage source 3b is set to a value which fails to operate cantilever 11 alone. For cantilever 11 that is designed to operate with the control signal of 40 V in FIGS. 2(A) through 2(D), the output voltage from constant-voltage source 3b is set to about −20 V, for example.

With a preset voltage being applied to cantilever 11, the magnitude of the voltage of the control signal may be reduced. In the above example, cantilever 11 can be operated by applying an ON/OFF signal of 20 V as the control signal to high-frequency signal line 1ab.

If a large voltage is applied as the control signal, a surge may take place or noise based on high-speed voltage changes may become distinctive. However, the micromachine switch shown in FIG. 18 can solve these problems because the magnitude of the voltage of the control signal can be reduced.

First and second high-frequency signal blocking means 4, 4a may be of a structure identical to those in the first and second embodiments.

5th Embodiment

The micromachine switch according to the present invention may be formed on substrate 10 together with other interconnections, or may be partly or wholly packaged as a chip and mounted on substrate 10, thus producing a microwave circuit (or millimeter wave circuit).

Unit circuits are formed on a substrate according to a semiconductor fabrication process, then individually cut off, and then mounted as micromachine switches on respective substrates 10. Such a process is referred to as a process of packaging a micromachine switch as a chip.

Figure 19A:
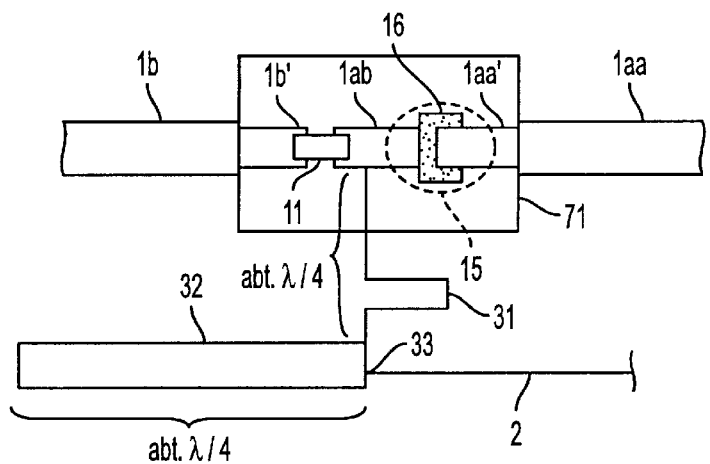
FIGS. 19(A) and 19(B) are plan views of the micromachine switch shown in FIGS. 9(A) and 9(B) which is constructed as a chip and mounted on a substrate.
Figure 19B:
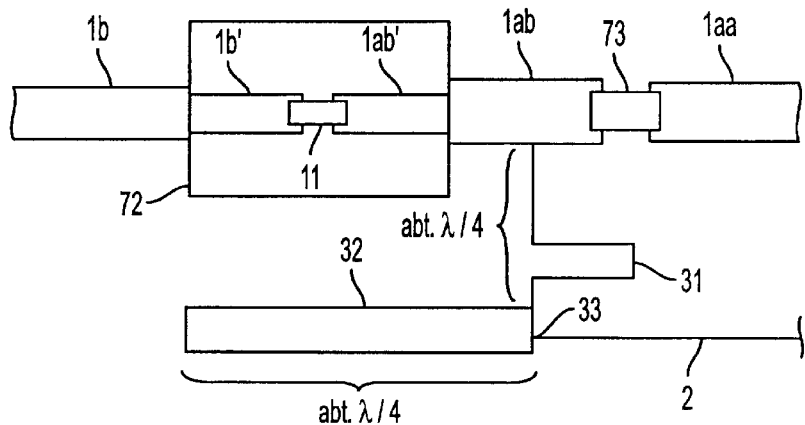

FIGS. 19(A) and 19(B) are plan views of the micromachine switch shown in FIGS. 9(A) and 9(B) which is constructed as a chip and mounted on substrate 10.

In FIG. 19(A), end 1b' of high-frequency signal line 1b, cantilever 11, high-frequency signal line 1ab, capacitor 15, and end 1aa' of high-frequency signal line 1aa are constructed as a chip 71.

On substrate 10, there have been formed portions of high-frequency signal lines 1aa, 1b except their ends, high-impedance λ/4 line 31, low-impedance λ/4 line 32, and first control signal line 2.

When chip 71 is mounted on substrate 10, the assembly provides the same functions as the micromachine switch shown in FIGS. 9(A) and 9(B).

In FIG. 19(B), end 1b' of high-frequency signal line 1b, cantilever 11, and end 1ab' of high-frequency signal line 1ab are constructed as a chip 72.

On substrate 10, there have been formed high-frequency signal line 1aa, portions of high-frequency signal lines 1ab, 1b except their ends, high-impedance λ/4 line 31, low-impedance λ/4 line 32, and first control signal line 2.

When chip 72 and chip capacitor 73 as capacitor 15 are mounted on substrate 10, the assembly provides the same functions as the micromachine switch shown in FIGS. 9(A) and 9(B).

With the micromachine switches constructed as chips as shown in FIGS. 19(A) and 19(B), since the chips 71, 72 can individually be checked for defects, the yield of overall circuits where the micromachine switches will be used can be increased.

6th Embodiment

In the micromachine switch shown in FIGS. 2(A) through 2(D), insulating films 14, 14a interposed between the lower surface of the distal end of arm 13 and the upper surface of the end of high-frequency signal line 1ab are used as the second insulating means which provides a capacitive coupling between high-frequency signal lines 1a, 1b. However, the second insulating means may be constructed without using these insulating films 14, 14a.

Figure 20:
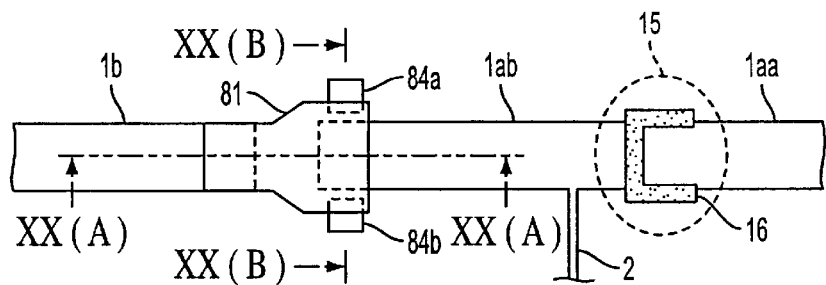
FIG. 20 is a plan view showing another arrangement of a second insulating means.
Figure 21A:
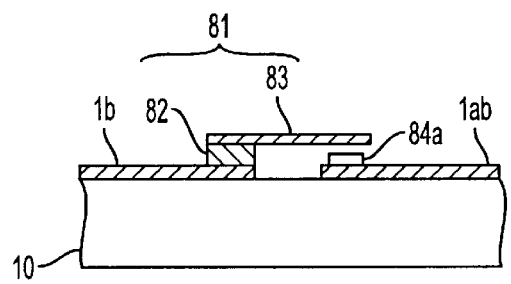
FIGS. 21(A) and 21(B) are cross-sectional views of the second insulating means shown in FIG. 20 when it is in a normal state.
Figure 21B:
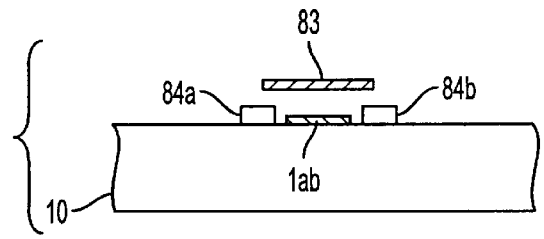
Figure 22A:
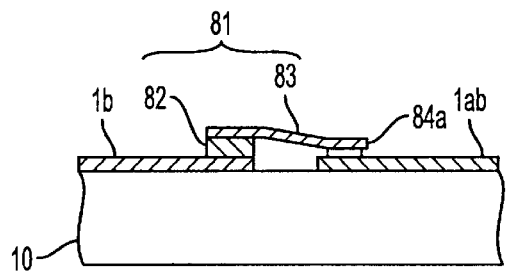
FIGS. 22(A) and 22(B) are cross-sectional views of the second insulating means shown in FIG. 20 when it is in a conducted state.
Figure 22B:
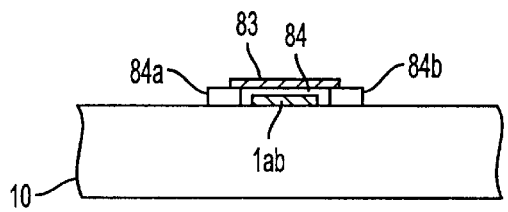

FIG. 20 is a plan view showing another arrangement of the second insulating means. FIGS. 21(A) and 21(B) are cross-sectional view of the second insulating means in a normal state. FIG. 21(A) is cross-sectional view taken along line XXI(A)—XXI(A) of FIG. 20, and FIG. 21(B) is cross-sectional view taken along line XXI(B)—XXI(B) of FIG. 20. FIGS. 22(A) and 22(B) are cross-sectional view of the second insulating means in a conducted state. FIG. 22(A) is a cross-sectional view corresponding to FIG. 21(A), and FIG. 22(B) is a cross-sectional view corresponding to FIG. 21(B).

As shown in FIG. 20, protrusions 84a, 84b are disposed on opposite sides of the end of high-frequency signal line 1ab in spaced relation to high-frequency signal line 1ab. As shown in FIGS. 21(A) and 21(B), protrusions 84a, 84b are slightly thicker than high-frequency signal line 1ab, i.e., higher than high-frequency signal line 1ab. Protrusions 84a, 84b may be made of either a dielectric material, a semiconductor, or a conductor.

Post 82 is disposed on the end of high-frequency signal line 1b, and arm 83 has a proximal end fixedly mounted on an upper surface of post 82. Arm 83 extends from the upper surface of post 82 to a position above the end of high-frequency signal line 1ab. Arm 83 is wider in its distal end than in its proximal end. As shown in FIG. 20, the distal end of arm 83 confronts both protrusions 84a, 84b.

With this arrangement, when attractive forces are developed between high-frequency signal line 1ab and arm 83 based on a control signal, the distal end of arm 83 is attracted toward high-frequency signal line 1ab under the attractive forces. Protrusions 84a, 84b function as a stopper, stopping arm 83 against downward displacement on the upper surface of protrusions 84a, 84b.

At this time, thin air layer 84 is formed between high-frequency signal line 1ab and arm 83. Though air layer 84 insulates high-frequency signal line 1ab and arm 83 from each other in a DC manner, high-frequency signal line 1ab and arm 83 are coupled to each other in a high-frequency fashion because air layer 84 is sufficiently thin.

INDUSTRIAL APPLICABILITY

As described above, the micromachine switch according to the present invention has the cantilever fixedly disposed on the end of the first or the second high-frequency signal line, and the control signal is applied directly to either one of the high-frequency signal lines to control operation of the cantilever. Thus the micromachine switch of simple structure is realized.

The first high-frequency signal blocking means for blocking the passage of the high-frequency signal flowing through the high-frequency signal line is connected to the first control signal line thereby to prevent the high-frequency signal from leaking from the high-frequency signal line to the first control signal line. Therefore, the insertion loss of the micromachine switch is reduced. As an electromagnetic coupling is prevented from occurring from the first control signal to another high-frequency signal line, the high-frequency characteristics of a circuit where the micromachine switch is used are improved.

The second control signal line is connected to the high-frequency signal line to which the control signal is not applied, and electric charges are charged and discharged via the second control signal line. The micromachine switch thus performs stable switching operation and has an increased switching speed.

In the above arrangement, the second high-frequency signal blocking means for blocking the passage of the high-frequency signal flowing through the high-frequency signal line is connected to the second control signal line thereby to prevent the high-frequency signal from leaking from the high-frequency signal line to the second control signal line. Therefore, the micromachine switch does not suffer the problems of an increased insertion loss and a high-frequency characteristic degradation.

If each of the first and second high-frequency signal blocking means comprises a bias T using a capacitor, then they share components, making the micromachine switch simpler in structure.

The second control signal line is connected to the high-frequency signal line to which the control signal is not applied, and a voltage of a polarity opposite to the control signal is applied to the second control signal line. Since the magnitude of the voltage of the control signal can be reduced, a surge and noise are prevented from taking place.

In the above arrangement, the second high-frequency signal blocking means for blocking the passage of the high-frequency signal flowing through the high-frequency signal line is connected to the second control signal line thereby to prevent the micromachine switch from suffering the problems of an increased insertion loss and a high-frequency characteristic degradation.

What is claimed is:

1. A micromachine switch disposed on a substrate to operate based on a control signal, comprising:

first and second high-frequency signal lines having their respective ends spaced from each other;

a cantilever fixed to the end of either said first or said second high-frequency signal line and extending to a position above the end of the other high-frequency signal line, said cantilever including an electrically conductive member;

first insulating means disposed on said first high-frequency signal line;

second insulating means disposed in an area where said cantilever and said other high-frequency signal line confront each other; and a first control signal line connected between the end of said first high-frequency signal line and said first insulating means, for applying said control signal which is represented by DC voltage level variations.

2. A micromachine switch according to claim 1, wherein said first insulating means comprises a capacitor.

3. A micromachine switch according to claim 1, wherein said second insulating means comprises an insulating film disposed on at least one of a lower surface of said cantilever and an upper surface of said other high-frequency signal line.

4. A micromachine switch according to claim 1, further comprising:

first high-frequency signal blocking means connected to said first control signal line, for blocking the passage of a high-frequency signal flowing through said first and second high-frequency signal lines.

5. A micromachine switch according to claim 4, wherein said first high-frequency signal blocking means comprises:

a high-impedance line having an end connected between the end of said first high-frequency signal line on which said first insulating means is disposed and said first insulating means, and having a line length which is about ¼ of the wavelength of said high-frequency signal and a characteristic impedance larger than the characteristic impedance of said first or second high-frequency signal line; and a low-impedance line having an end connected to the other end of said high-impedance line and an opposite end which is open, and having a line length which is about ¼ of the wavelength of said high-frequency signal and a characteristic impedance smaller than the characteristic impedance of said high-impedance line, said first control signal line being connected to the other end of said high-impedance line.

6. A micromachine switch according to claim 4, wherein said first high-frequency signal blocking means comprises:
  a high-impedance line having an end connected between the end of said first high-frequency signal line on which said first insulating means is disposed and said first insulating means, and having a line length which is about ¼ of the wavelength of said high-frequency signal and a characteristic impedance larger than the characteristic impedance of said first or second high-frequency signal line; and
  a capacitor having an electrode connected to the other end of said high-impedance line and another electrode to ground,
  said first control signal line being connected to the other end of said high-impedance line.

7. A micromachine switch according to claim 4, wherein said first high-frequency signal blocking means comprises an inductive element.

8. A micromachine switch according to claim 4, wherein said first high-frequency signal blocking means comprises a resistive element having an impedance sufficiently larger than the characteristic impedance of said first or second high-frequency signal line.

9. A micromachine switch according to claim 8, wherein said resistive element is inserted in series in said first control signal line.

10. A micromachine switch according to claim 8, wherein said resistive element has an end connected to said first control signal line and another end which is open.

11. A micromachine switch according to claim 4, further comprising:
  a second control signal line connected to said second high-frequency signal line on which said first insulating means is not disposed, for charging and discharging electric charges generated by electrostatic induction; and
  second high-frequency signal blocking means connected to said second control signal line, for blocking the passage of said high-frequency signal flowing through said first and second high-frequency signal lines.

12. A micromachine switch according to claim 11, wherein said second high-frequency signal blocking means comprises:
  a high-impedance line having an end connected to said second high-frequency signal line on which said first insulating means is not disposed, and having a line length which is about ¼ of the wavelength of said high-frequency signal and a characteristic impedance larger than the characteristic impedance of said first or second high-frequency signal line; and
  a low-impedance line having an end connected to the other end of said high-impedance line and an opposite end which is open, and having a line length which is about ¼ of the wavelength of said high-frequency signal and a characteristic impedance smaller than the characteristic impedance of said high-impedance line;
  said second control signal line being connected to the other end of said high-impedance line.

13. A micromachine switch according to claim 11, wherein said second high-frequency signal blocking means comprises:
  a high-impedance line having an end connected to said second high-frequency signal line on which said first insulating means is not disposed, and having a line length which is about ¼ of the wavelength of said high-frequency signal and a characteristic impedance larger than the characteristic impedance of said first or second high-frequency signal line; and
  a capacitor having an electrode connected to the other end of said high-impedance line and another electrode to ground;
  said second control signal line being connected to the other end of said high-impedance line.

14. A micromachine switch according to claim 11, wherein said second high-frequency signal blocking means comprises an inductive element.

15. A micromachine switch according to claim 11, wherein said second high-frequency signal blocking means comprises a resistive element having an impedance sufficiently larger than the characteristic impedance of said first or second high-frequency signal line.

16. A micromachine switch according to claim 15, wherein said resistive element is inserted in series in said second control signal line.

17. A micromachine switch according to claim 15, wherein said resistive element has an end connected to said second control signal line and another end which is open.

18. A micromachine switch according to claim 1, further comprising:
  a first high-impedance line having an end connected between the end of said first high-frequency signal line on which said first insulating means is disposed and said first insulating means, and having a line length which is about ¼ of the wavelength of a first or second high-frequency signal and a characteristic impedance larger than the characteristic impedance of said first or second high-frequency signal line;
  a second high-impedance line having an end connected to said second high-frequency signal line on which said first insulating means is not disposed, and having a line length which is about ¼ of the wavelength of said first or second high-frequency signal and a characteristic impedance larger than the characteristic impedance of said first or second high-frequency signal line; and
  a capacitor having an electrode connected to the other end of said first high-impedance line and another electrode to the other end of said second high-impedance line;
  the other end of said first high-impedance line being connected to ground.

19. A micromachine switch according to claim 4, further comprising:
  third insulating means disposed on said second high-frequency signal line on which said first insulating means is not disposed;
  a second control signal line connected between the end of said second high-frequency signal line on which said third insulating means is disposed and said third insulating means, for applying a constant voltage having a polarity opposite to said control signal; and
  second high-frequency signal blocking means connected to said second control signal line, for blocking the passage of a high-frequency signal flowing through said first and second high-frequency signal lines;
  the arrangement being such that a DC voltage between said second and third insulating means is kept at the level of said constant voltage.

20. A method of manufacturing a micromachine switch for use in a millimeter wave circuit and a microwave circuit, comprising the steps of:

forming, on a substrate, a first high-frequency signal line, a third high-frequency signal line having an end spaced from an end of said first high-frequency signal line, and a control signal line connected to said third high-frequency signal line;

forming a sacrificial layer in at least a region extending from a gap between said first and third high-frequency signal lines to the end of said third high-frequency signal line;

forming a first insulating film on a portion of said sacrificial layer which confronts the end of said third high-frequency signal line, and a second insulating film on the other end of third high-frequency signal line;

forming a cantilever of metal in a region extending from the end of said first high-frequency signal line to said first insulating film on said sacrificial layer, and a fourth high-frequency signal line extending from an upper surface of said second insulating film onto said substrate; and removing said sacrificial layer.

21. A method of manufacturing a micromachine switch for use in a millimeter wave circuit and a microwave circuit, comprising the steps of:

forming, on a substrate, a fifth high-frequency signal line, a second high-frequency signal line having an end spaced from an end of said fifth high-frequency signal line, and a control signal line connected to said fifth high-frequency signal line;

forming a sacrificial layer in at least a region extending from a gap between said fifth and second high-frequency signal lines to the end of said second high-frequency signal line;

forming a first insulating film on a portion of said sacrificial layer which confronts the end of said second high-frequency signal line, and a second insulating film on the other end of fifth high-frequency signal line;

forming a cantilever of metal in a region extending from the end of said fifth high-frequency signal line to said first insulating film on said sacrificial layer, and a sixth high-frequency signal line extending from an upper surface of said second insulating film onto said substrate; and removing said sacrificial layer.

* * * * *